(12) United States Patent
Minami et al.

(10) Patent No.: US 7,309,747 B2
(45) Date of Patent: *Dec. 18, 2007

(54) HIGHLY FLOWABLE 1-BUTENE POLYMER AND PROCESS FOR PRODUCING THE SAME

(75) Inventors: Yutaka Minami, Chiba (JP); Masami Kanamaru, Chiba (JP); Toyozo Fujioka, Chiba (JP); Tomoaki Takebe, Chiba (JP); Masao Inoue, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/505,264

(22) PCT Filed: Feb. 19, 2003

(86) PCT No.: PCT/JP03/01793

§ 371 (c)(1),
(2), (4) Date: Feb. 1, 2005

(87) PCT Pub. No.: WO03/070788

PCT Pub. Date: Aug. 28, 2003

(65) Prior Publication Data

US 2005/0119428 A1    Jun. 2, 2005

(30) Foreign Application Priority Data

Feb. 21, 2002    (JP) .............................. 2002-044362

(51) Int. Cl.
*C08F 4/52*    (2006.01)
*C08F 4/76*    (2006.01)

(52) U.S. Cl. .................. 526/160; 526/170; 526/348.6; 526/134; 526/126; 526/943

(58) Field of Classification Search ............. 526/348.6, 526/160, 170, 943, 129, 126; 528/396
See application file for complete search history.

(56) References Cited

U.S. PATENT DOCUMENTS

| | | | | |
|---|---|---|---|---|
| 5,496,902 A | * | 3/1996 | Evertz et al. ................ | 526/127 |
| 5,854,165 A | * | 12/1998 | Yabunouchi et al. ........ | 502/117 |
| 6,180,720 B1 | * | 1/2001 | Collina et al. ............... | 525/191 |
| 6,218,457 B1 | * | 4/2001 | Fralich et al. ............... | 524/489 |
| 6,221,967 B1 | * | 4/2001 | Rodriguez et al. .......... | 525/274 |
| 6,339,135 B1 | * | 1/2002 | Kashiwamura et al. ..... | 526/160 |
| 6,414,090 B2 | * | 7/2002 | Minami et al. .............. | 525/338 |
| 6,906,155 B1 | * | 6/2005 | Minami et al. .............. | 526/160 |
| 6,930,160 B2 | * | 8/2005 | Minami et al. ........... | 526/348.6 |
| 2003/0069320 A1 | | 4/2003 | Minami et al. | |
| 2004/0096682 A1 | | 5/2004 | Kanamaru et al. | |
| 2004/0204552 A1 | | 10/2004 | Minami et al. | |

FOREIGN PATENT DOCUMENTS

| | | | |
|---|---|---|---|
| JP | 62-119213 | * | 5/1987 |
| JP | 8-225605 | | 9/1996 |
| JP | 8/269417 | | 10/1996 |
| WO | 95-09172 | | 4/1995 |
| WO | 96/30380 | | 10/1996 |
| WO | 02/16450 | | 2/2002 |

* cited by examiner

*Primary Examiner*—David W. Wu
*Assistant Examiner*—Rip A. Lee
(74) *Attorney, Agent, or Firm*—Oblon, Spivak, McClelland, Maier & Neustadt, P.C.

(57) ABSTRACT

A 1-butene polymer satisfying the following (1), (2) and either (3) or (3'): a process for producing the polymer; a resin modifier comprising the polymer; and a hot-melt adhesive containing the polymer. (1) The intrinsic viscosity [η] as measured in tetralin solvent at 135° C. is 0.01 to 0.5 dL/g. (2) The polymer is a crystalline resin having a melting point (Tm-D) of 0 to 100° C., the melting point being defined as the top of the peak observed on the highest-temperature side in a melting endothermic curve obtained with a differential scanning calorimeter (DSC) in a test in which a sample is held in a nitrogen atmosphere at −10° C. for 5 min and then heated at a rate of 10° C./min. (3) The stereoregularity index {(mmmm)/(mmrr+rmmr)} is 30 or lower. (3') The mesopentad content (mmmm) determined from a nuclear magnetic resonance (NMR) spectrum is 68 to 73%.

9 Claims, No Drawings

HIGHLY FLOWABLE 1-BUTENE POLYMER AND PROCESS FOR PRODUCING THE SAME

TECHNICAL FIELD

The present invention relates to a 1-butene-based polymer that has a high-fluidity and is well-balanced between fluidity, tensile modulus and tensile elongation, and fabricability (secondary processability), a process for producing the 1-butene-based polymer, a resin modifier made of the 1-butene-based polymer, and a hot-melt adhesive containing the 1-butene-based polymer.

The 1-butene-based polymer of the present invention is suitably used in various applications such as hot-melt adhesives, sealing agents, modifiers for resins and elastomers, wax blending agents and filler blending agents.

BACKGROUND ART

Hitherto, as polymers that have relatively low molecular weight and crystallinity and are usable as hot-melt adhesives, etc., there are known propylene homopolymers or olefin-based polymers produced by copolymerizing propylene with ethylene or 1-butene.

However, these polymers are deteriorated in uniformity due to broad molecular weight distribution and broad composition distribution thereof.

Meanwhile, conventionally, 1-butene polymers have been produced using magnesium-supported titanium catalysts (Japanese Patent Application Laid-Open No. Hei 7-145205). However, the thus produced 1-butene polymers have a non-uniform composition which, therefore, gives adverse influences on properties thereof such as occurrence of stickiness and poor transparency.

In this regard, in recent years, 1-butene polymers having a uniform composition have been produced using metallocene catalysts (Japanese Patent Application Laid-Open Nos. Sho 62-119214, Sho 62-121708, Sho 62-121707, Sho 62-119213 and Hei 8-225605).

In addition, Japanese Patent Application Laid-Open No. Sho 63-57615 discloses high-fluidity 1-butene-based polymers.

However, in any of these conventional methods, since non-crosslinked metallocene catalysts are used therein, the obtained polymers are liquid amorphous 1-butene-based polymers. Therefore, these 1-butene-based polymers have problems concerning poor surface properties, etc.

Also, hot-melt adhesives used in hot-melt bonding methods in which high-molecular compounds are heat-melted and bonded together, have been extensively employed in various applications because they are excellent in high-speed coatability, rapid curability, solvent-free applicability, barrier property, energy-saving property, inexpensiveness, etc.

The conventional hot-melt adhesives are mainly composed of resins prepared by blending a tackifier resin or a plasticizer in a base polymer such as natural rubbers, ethylene-vinyl acetate copolymers, styrene-butadiene-styrene block copolymers and styrene-isoprene-styrene block copolymers.

However, since the above base polymers contain a large amount of double bonds, the hot-melt adhesives produced using such base polymers exhibit a poor thermal stability upon heating and, therefore, suffer from oxidation, gelation, decomposition and discoloration upon coating. In addition, there occurs such a problem that portions bonded by the hot-melt adhesives are deteriorated in strength with time.

Further, the hot-melt adhesives are also deteriorated in adhesion to low-polar substances such as polyethylene and polypropylene.

To solve the deteriorated adhesion to the low-polar substances, there have been conventionally known hot-melt adhesive resins containing propylene as a base polymer. Although these resins show an excellent thermal stability, the base polymer contained therein has a too high hardness and is deteriorated in fluidity. As a result, the hot-melt adhesive resins must be applied under a high temperature condition, so that there occurs such a problem that the thermal stability of the resins becomes lowered under such a high-temperature condition and, therefore, a sufficient adhesion strength cannot be attained.

In this regard, as described above, it is known that propylene homopolymers as well as olefin-based polymers having relatively low molecular weight and crystallinity which are produced by copolymerizing propylene with ethylene or 1-butene, are usable as the base polymer for the hot-melt adhesives (Japanese Patent Application Laid-Open No. Hei 7-145205).

These polymers are excellent in balance between fluidity, flexibility and fabricability, but deteriorated in tenacity. Therefore, when these polymers are used as an adhesive between an elastomer and a nonwoven fabric, there arises such a problem that the resultant product is deteriorated in adhesion strength.

For example, there is known the method using low-crystalline polymers which are enhanced in tenacity by reducing a stereoregularity thereof (Japanese Patent Application Laid-Open No. 2002-322213). However, when the stereoregularity of the polymers is excessively reduced, crystallized portions serving as physical crosslinking points are insufficient, which rather results in deteriorated tenacity of the polymers.

On the other hand, when the molecular weight of the polymers increases to allow the polymers to be entangled with each other and thereby attain a good tenacity, the resultant polymers exhibit a high tenacity, but tend to be deteriorated in fluidity.

Thus, in the conventional hot-melt adhesives, it has been required to control the balance between fluidity and tenacity of the base polymer used therein.

The present invention has been completed to solve the above conventional problems. An object of the present invention is to provide a 1-butene-based polymer having a uniform composition, a well-controlled stereoregularity, a high fluidity and a high flexibility, a process for producing the 1-butene-based polymer, and a resin modifier made of the 1-butene-based polymer.

A further object of the present invention is to solve the problems as to poor tenacity of the base polymer used in the conventional hot-melt adhesives, and provide a hot-melt adhesive containing the 1-butene-based polymer which is excellent in not only balance between fluidity and tenacity, thermal stability under a high temperature condition, and adhesion to low-polar substances, but also heat resistance at the bonded surface.

DISCLOSURE OF THE INVENTION

As a result of extensive researches for accomplishing the above objects, the inventors have found that the 1-butene-based polymers can be produced at a high activity in the presence of a polymerization catalyst composed of (A) a specific transition metal compound and (B) at least one component selected from the group consisting of (B-1) a compound capable of forming an ionic complex by reacting with said transition metal compound (A), and (B-2) aluminoxane, and the obtained 1-butene-based polymers exhibit a suitable molecular weight distribution and composition distribution as well as a good balance between fluidity, physical property (elastic modulus) and fabricability (melting point).

In addition, the inventors have found that the 1-butene-based polymers having a zero-shear viscosity $\eta^0$ of 300 Pa·s or lower as an index of the fluidity and a tensile elongation at break of 100% or more as an index of the tenacity are excellent in balance between fluidity and tenacity as well as fabricability (melting point), and are suitably used as a base polymer for hot-melt adhesives.

The present invention has been accomplished based on the above findings.

Thus, the present invention provides the following 1-butene-based polymer, process for producing the 1-butene-based polymer, resin modifier made of the 1-butene-based polymer, and hot-melt adhesive containing the 1-butene-based polymer.

1. A high-fluidity 1-butene-based polymer satisfying the following requirements (1), (2) and (3):

(1) an intrinsic viscosity [η] of 0.01 to 0.5 dL/g as measured in a tetralin solvent at 135° C.;

(2) a crystalline resin having a melting point (Tm-D) of 0 to 100° C., the melting point being defined as a top of a peak observed on a highest-temperature side in a melting endothermic curve obtained by a differential scanning calorimeter (DSC) when a sample is held in a nitrogen atmosphere at −10° C. for 5 min and then heated at a temperature rise rate of 10° C./min; and (3) a stereoregularity index {(mmmm)/(mmrr+rmmr)} of 30 or lower.

2. A high-fluidity 1-butene-based polymer satisfying the following requirements (1), (2) and (3'):

(1) an intrinsic viscosity [η] of 0.25 to 0.5 dL/g as measured in a tetralin solvent at 135° C.;

(2) a crystalline resin having a melting point (Tm-D) of 0 to 100° C., the melting point being defined as a top of a peak observed on a highest-temperature side in a melting endothermic curve obtained by a differential scanning calorimeter (DSC) when a sample is held in a nitrogen atmosphere at −10° C. for 5 min and then heated at a temperature rise rate of 10° C./min; and (3') a mesopentad fraction (mmmm) of 68 to 73% as determined from a nuclear magnetic resonance (NMR) spectrum.

3. The high-fluidity 1-butene-based polymer according to the above aspect 2, wherein said polymer has a zero-shear viscosity $\eta^0$ of 300 Pa·s or lower and a tensile elongation at break of 100% or more.

4. The high-fluidity 1-butene-based polymer according to the above aspect 1 or 2, wherein said polymer further satisfies the following requirements (4) and (5):

(4) a molecular weight distribution (Mw/Mn) of 4 or lower as measured by gel permeation chromatography (GPC); and (5) a weight-average molecular weigh(Mw) of 10,000 to 100,000 as measured by GPC.

5. A process for producing a high-fluidity 1-butene-based polymer, comprising:, homopolymerizing 1-butene, or copolymerizing 1-butene with ethylene and/or a $C_3$ to $C_{20}$ α-olefin except for 1-butene, in the presence of a polymerization catalyst comprising:

(A) a transition metal compound represented by the following general formula (I):

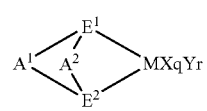

wherein M is a metal element belonging to Groups 3 to 10 or lanthanoid of the Period Table;

$E^1$ and $E^2$ are independently a ligand selected from the group consisting of substituted cyclopentadienyl, indenyl, substituted indenyl, heterocyclopentadienyl, substituted heterocyclopentadienyl, amide group, phosphide group, hydrocarbon groups and silicon-containing groups, which form a cross-linked structure via $A^1$ and $A^2$ and may be same or different from each other;

X is a ligand capable of forming a σ-bond with the proviso that when a plurality of X groups are present, these X groups may be same or different from each other, and may be cross-linked with the other X group, $E^1$, $E^2$ or Y;

Y is a Lewis base with the proviso that when a plurality of Y groups are present, these Y groups may be same or different from each other, and may be cross-linked with the other Y group, $E^1$, $E^2$ or X;

$A^1$ and $A^2$ are divalent cross-linking groups capable of bonding the two ligands $E^1$ and $E^2$ to each other which may be same or different from each other, and are independently a $C_1$ to $C_{20}$ hydrocarbon group, a $C_1$ to $C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR— wherein $R^1$ is a hydrogen atom, a halogen atom, a $C_1$ to $C_{20}$ hydrocarbon group or a $C_1$ to $C_{20}$ halogen-containing hydrocarbon group;

q is an integer of 1 to 5 given by the formula: [(valence of M)−2]; and r is an integer of 0 to 3, and (B) at least one component selected from the group consisting of (B-1) a compound capable of forming an ionic complex by reacting with said transition metal compound (A), and (B-2) aluminoxane.

6. The process according to the above aspect 5, wherein 1-butene is homopolymerized in the presence of the polymerization catalyst containing an organoboron compound as the component (B).

7. The process according to the above aspect 5, wherein 1-butene is copolymerized with ethylene and/or a $C_3$ to $C_{20}$ α-olefin except for 1-butene in the presence of the polymerization catalyst containing an organoboron compound as the component (B).

8. A process for producing the high-fluidity 1-butene-based polymer as described in the above aspect 1 or 2, comprising:

homopolymerizing 1-butene, or copolymerizing 1-butene with ethylene and/or a $C_3$ to $C_{20}$ α-olefin except for 1-butene, in the presence of a polymerization catalyst comprising:

(A) a transition metal compound represented by the above general formula (I) and (B) at least one component selected from the group consisting of (B-1) a compound capable of forming an ionic complex by reacting with said transition metal compound (A), and (B-2) aluminoxane.

9. The process according to the above aspect 8, wherein the component (B) is an organoboron compound.

10. A high-fluidity 1-butene-based polymer produced by the process as described in the above aspect 6 or 7.

11. A 1-butene-based resin modifier comprising the high-fluidity 1-butene-based polymer as described in the above 1.

12. A hot-melt adhesive containing the high-fluidity 1-butene-based polymer as described in the above 2.

BEST MODE FOR CARRYING OUT THE INVENTION

The present invention will be described in detail below.

In the following descriptions, [1] the 1-butene-based polymer, [2] the process for producing the 1-butene-based polymer, [3] the 1-butene-based resin modifier and [4] the hot-melt adhesive containing the 1-butene-based polymer are explained in detail.

[1] 1-Butene-based Polymer

The 1-butene-based polymer according to the aspect 1 of the present invention satisfies the following requirements (1) to (3).

(1) an intrinsic viscosity [η] of 0.01 to 0.5 dL/g as measured in a tetralin solvent at 135° C.;

(2) a crystalline resin having a melting point (Tm-D) of 0 to 100° C., the melting point being defined as a top of a peak observed on a highest-temperature side in a melting endothermic curve obtained by a differential scanning calorimeter (DSC) when a sample is held in a nitrogen atmosphere at −10° C. for 5 min and then heated at a temperature rise rate of 10° C./min; and (3) a stereoregularity index {(mmmm)/(mmrr+rmmr)} of 30 or lower.

The 1-butene-based polymer according to the aspect 2 of the present invention satisfies the following requirements (1), (2) and (3').

(1) an intrinsic viscosity [η] of 0.25 to 0.5 dL/g as measured in a tetralin solvent at 135° C.;

(2) a crystalline resin having a melting point (Tm-D) of 0 to 100° C., the melting point being defined as a top of a peak observed on a highest-temperature side in a melting endothermic curve obtained by a differential scanning calorimeter (DSC) when a sample is held in a nitrogen atmosphere at −10° C. for 5 min and then heated at a temperature rise rate of 10° C./min; and (3') a mesopentad fraction (mmmm) of 68 to 73% as determined from a nuclear magnetic resonance (NMR) spectrum.

The 1-butene-based polymer according to the aspect 1 of the present invention has an intrinsic viscosity [η] of 0.01 to 0.5 dL/g as measured in a tetralin solvent at 135° C. The intrinsic viscosity [η] is preferably 0.1 to 0.5 dL/g.

If the intrinsic viscosity [η] is less than 0.01 dL/g, the resultant polymer tends to be deteriorated in physical property (strength). If the intrinsic viscosity [η] exceeds 0.5 dL/g, the resultant polymer tends to be deteriorated in fluidity.

The 1-butene-based polymer according to the aspect 2 of the present invention has an intrinsic viscosity [η] of 0.25 to 0.5 dL/g as measured in a tetralin solvent at 135° C. The intrinsic viscosity [η] is preferably 0.30 to 0.5 dL/g.

If the intrinsic viscosity [η] is less than 0.25 dL/g, the resultant polymer tends to be insufficient in number of molecules bonding between crystals, and tends to be deteriorated in tenacity (tensile elongation at break) when used in hot-melt adhesives. If the intrinsic viscosity [η] exceeds 0.5 dL/g, the resultant polymer tends to have a too high viscosity and be deteriorated in fluidity, resulting in occurrence of defects upon molding.

The 1-butene-based polymer according to the aspect 1 or 2 of the present invention must be a crystalline resin having a melting point (Tm-D) of 0 to 100° C. and preferably 0 to 80° C. as measured by differential scanning calorimeter (DSC) in view of a good softness thereof.

The melting point (Tm-D) is determined by the DSC measurement as follows.

That is, using a differential scanning calorimeter ("DSC-7" available from Perkin Elmer Corp.), 10 mg of a sample is held in a nitrogen atmosphere at −10° C. for 5 min, and then heated at a temperature rise rate of 10° C./minute to prepare a melting endothermic curve. The top of a peak observed on the highest temperature side in the melting endothermic curve is defined as the melting point (Tm-D).

The crystalline resin used in the present invention means a resin having the measurable melting point (Tm-D).

The 1-butene-based polymer according to the aspect 1 of the present invention has a stereoregularity index {(mmmm)/(mmrr+rmmr)} of 30 or lower, preferably 20 or lower and more preferably 15 or lower.

If the stereoregularity index exceeds 30, the resultant polymer tends to be deteriorated in flexibility and fabricability.

Here, the mesopentad fraction (mmmm) is preferably 20 to 90%, more preferably 40 to 85% and most preferably 60 to 80%.

If the mesopentad fraction is less than 20%, the resultant molded article tends to exhibit stickiness on its surface or be deteriorated in transparency.

On the other hand, if the mesopentad fraction exceeds 90%, the resultant polymer tends to be deteriorated in flexibility and fabricability.

The 1-butene-based polymer according to the aspect 2 of the present invention has a mesopentad fraction (mmmm) of 68 to 73% and preferably 69 to 73%.

If the mesopentad fraction is less than 68%, the resultant polymer tends to be insufficient in content of crystals serving as physical crosslinking points owing to a too low crystallinity thereof. As a result, the polymer tends to be deteriorated in tensile elongation at break when used in hot-melt adhesives.

On the other hand, if the mesopentad fraction exceeds 73%, the resultant polymer tends to have excessive physical crosslinking points, resulting in deterioration in flexibility and tensile elongation at break.

The 1-butene-based polymer according to the aspect 1 or 2 of the present invention contains 1,4-insertion portions in an amount of 5% or lower.

If the content of the 1,4-insertion portions exceeds 5%, the resultant polymer has a broad composition distribution, resulting in adverse influences on physical properties thereof.

In the present invention, the mesopentad fraction (mmmm) and the abnormal insertion content (1,4-insertion fraction) is determined according to the method reported and proposed in Asakura et al., "Polymer Journal", 16, 717 (1984), J. Randall et al., "Macromol. Chem. Phys.", C29, 201(1989), and V. Busico et al., "Macromol. Chem. Phys.", 198, 1257(1997).

More specifically, the mesopentad fraction and the abnormal insertion content in the molecule of poly(1-butene) are determined by measuring signals attributed to methylene and methine groups using $^{13}C$ nuclear magnetic resonance spectrum.

The $^{13}$C nuclear magnetic resonance spectrum measurement is carried out using the following apparatus under the following conditions.

Apparatus: $^{13}$C-NMR spectrometer "JNM-EX400 Model" available from Nippon Denshi Co., Ltd.;
Method: proton complete decoupling method;
Sample concentration: 230 mg/mL;
Solvent: mixed solvent of 1,2,4-trichlorobenzene and heavy benzene (volume ratio: 90:10);
Measuring temperature: 130° C.;
Pulse width: 45°;
Pulse repetition period: 4 s; and
Cumulative frequency: 10,000 times In the present invention, the stereoregularity index {(mmmm)/(mmrr+rmmr)} is calculated from values (mmmm), (mmmr) and (rmmr) measured by the above method.

The 1-butene-based polymer according to the aspect 1 or 2 of the present invention has, in addition to the above requirements, a molecular weight distribution (Mw/Mn) of preferably 4 or lower, more preferably 3.5 or lower and still more preferably 3.0 or lower as measured by GPC.

If the molecular weight distribution (Mw/Mn) exceeds 4, the resultant polymer tends to suffer from occurrence of stickiness.

Also, the 1-butene-based polymer according to the aspect 1 or 2 of the present invention has, in addition to the above requirements, a weight-average molecular weight (Mw) of preferably 10,000 to 100,000 as measured by GPC.

If the weight-average molecular weight (Mw) is less than 10,000, the resultant polymer tends to be deteriorated in physical properties (strength).

In addition, if the weight-average molecular weight (Mw) exceeds 100,000, the resultant polymer tends to be deteriorated in fluidity, resulting in poor processability.

Meanwhile, the molecular weight distribution (Mw/Mn) is calculated from the weight-average molecular weight Mw and number-average molecular weight Mn in terms of polystyrene which are measured by GPC using the following apparatus and conditions:

GPC measuring apparatus
Column: TOSO GMHHR-H(S)HT
Detector: RI Detector "WATERS 150C" for liquid chromatogram
Measuring conditions:
Solvent: 1,2,4-trichlorobenzene;
Measuring temperature: 145° C.;
Flow rate: 1.0 mL/min;
Sample concentration: 2.2 mg/mL;
Amount charged: 160 µL;
Calibration curve: Universal Calibration; and
Analytic program: HT-GPC (Ver. 10)

The 1-butene-based polymer according to the aspect 1 of the present invention has a tensile modulus of preferably 500 MPa or lower and more preferably 300 MPa or lower as measured in a tensile test according to JIS K-7113.

If the tensile modulus exceeds 500 MPa, the resultant polymer may fail to show a sufficient softness.

The 1-butene-based polymer according to the aspect 2 of the present invention has a tensile elongation at break of 100% or higher as measured in a tensile test according to JIS K-7113 and a zero-shear viscosity $\eta^0$ of less than 300 Pa·s.

If the tensile elongation at break is less than 100%, the resultant 1-butene-based polymer tends to be deteriorated in tenacity, so that a hot-melt adhesive using the polymer may fail to attain a sufficient adhesion strength. If the zero-shear viscosity $\eta^0$ is 300 Pa·s or higher, the resultant 1-butene-based polymer tends to be deteriorated in coatability to an adherend due to poor fluidity, resulting in defects upon molding.

Meanwhile, the zero-shear viscosity $\eta^0$ is measured using the following apparatus and conditions.

That is, first, using a parallel disk-type rotary rheometer "RMS800" (plate: 50 mmφ; plate intervals: 0.9 mm) available from Rheometrics Corp., a 20% sinusoidal shear strain is applied to a sample polymer at 120° C. in a range of an angular frequency ω of 0.1 to 100 r/s to obtain an absolute value of complex viscosity |η*| thereof. The thus obtained absolute value of complex viscosity |η*| is extrapolated to ω=0 r/s to calculate the zero-shear viscosity $\eta^0$.

The tensile elongation at break and the zero-shear viscosity $\eta^0$ of the 1-butene-based polymer are important control factors for the hot-melt adhesives.

The former factor is controlled depending upon the number of molecules bonding crystals with each other and the number of crystal portions as physical crosslinking points, and can be mainly controlled by the intrinsic viscosity [η] or molecular weight as well as the stereoregularity of the 1-butene-based polymer, whereas the latter factor can be controlled by the intrinsic viscosity [η] or molecular weight of the 1-butene-based polymer.

When the 1-butene-based polymer of the present invention is in the form of a copolymer, the copolymer is preferably a random copolymer.

In addition, the content of structural units derived from 1-butene in the copolymer is preferably 50 mol % or higher and more preferably 70 mol % or higher.

If the content of structural units derived from 1-butene in the copolymer is less than 50 mol %, the resultant copolymer tends to be deteriorated in fabricability.

Also, when the 1-butene-based polymer of the present invention is in the form of a copolymer, the copolymer has a randomness index of 1 or less as determined from α-olefin chains according to the follow formula:

$$R=4[\alpha\alpha][BB]/[\alpha B]^2$$

wherein [αα] represents an α-olefin chain fraction; [BB] represents a butene chain fraction; and [αB] represents an α-olefin-butene chain fraction.

The randomness index R is an index representing a degree of random copolymerization of the copolymer. The smaller the randomness index R, the higher the isolation of the α-olefin (comonomer) becomes and the more uniform the composition thereof becomes.

The randomness index R is preferably 0.5 or lower and more preferably 0.2 or lower.

When the randomness index R is 0, no αα chains are present, and the α-olefin chain is completely composed of an isolated chain solely.

When the 1-butene-based polymer is in the form of a propylene/butene copolymer, the butene content and randomness index R thereof are determined as follows Specifically, the butene content and randomness index R are calculated from $^{13}$C-NMR spectrum measured using an NMR apparatus "JNM-EX400 Model" available from Nippon Denshi Co., Ltd., under the following conditions.

Sample concentration: 220 mg/3 mL of NMR solution;
NMR solution: 1,2,4-trichlorobenzene/benzene-d6 (90/10 vol %);
Measuring temperature: 130° C.;
Pulse width: 45°;
Pulse repetition period: 10 s; and
Cumulative frequency: 4,000 times.

Under the above conditions, signals attributed to Sαα carbon in 13C-NMR spectrum for PP, PB and BB chains are measured by the method proposed in J. C. Randall, "Macromolecules", 1978, 11, 592, to determine PP, PB and BB diad chain fractions in the molecular chain of the copolymer.

From the thus obtained respective diad chain fractions, the butene content and the randomness index R are calculated according to the following formulae:

Butene Content (mol %)=[BB]+[PB]/2

Randomness Index R=4[PP][BB]/[PB]² wherein [PP] represents a propylene chain fraction; [BB] represents a butene chain fraction; and [PB] represents a propylene-butene chain fraction.

When the 1-butene-based polymer is in the form of an octene/butene copolymer, the butene content and R thereof are determined as follows.

Specifically, the butene content and randomness index R are calculated from $^{13}$C-NMR spectrum measured using an NMR apparatus "JNM-EX400 Model" available from Nippon Denshi Co., Ltd., under the following conditions.

Sample concentration: 220 mg/3 mL of NMR solution;
NMR solution: 1,2,4-trichlorobenzene/benzene-d6 (90/10 vol %);
Measuring temperature: 130° C.;
Pulse width: 45°;
Pulse repetition period: 10 s; and
Cumulative frequency: 4,000 times.

Under the above conditions, signals attributed to Sαα carbon in $^{13}$C-NMR spectrum are measured to obtain OO, OB and BB diad chain fractions in the molecular chain of the copolymer from the peak intensity values derived from BB chain observed at 40.8 to 40.0 ppm, OB chain observed at 41.3 to 40.8 ppm and OO chain observed at 42.5 to 41.3 ppm.

From the thus obtained respective diad chain fractions (mol %), the butene content and randomness index R are calculated according to the following formulae:

Butene Content (mol %)=[BB]+[OB]/2

Randomness Index R=4[OO][BB]/[OB]² wherein [OO] represents an octene chain fraction; [BB] represents a butene chain fraction; and [OB] represents an octene-butene chain fraction.

[2] Process for Production of 1-Butene-based Polymer

In the process for production of the 1-butene-based polymer according to the present invention, the 1-butene-based polymer is produced by homopolymerizing 1-butene, or copolymerizing 1-butene with ethylene and/or a $C_3$ to $C_{20}$ α-olefin except for 1-butene, in the presence of a polymerization catalyst comprising:

(A) a transition metal compound represented by the following general formula (I):

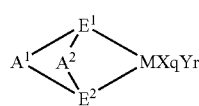

(I)

wherein M is a metal element belonging to Groups 3 to 10 or lanthanoid of the Period Table;

$E^1$ and $E^2$ are independently a ligand selected from the group consisting of substituted cyclopentadienyl, indenyl, substituted indenyl, heterocyclopentadienyl, substituted heterocyclopentadienyl, amide group, phosphide group, hydrocarbon groups and silicon-containing groups, which form a cross-linked structure via $A^1$ and $A^2$ and may be same or different from each other;

X is a ligand capable of forming a σ-bond with the proviso that when a plurality of X groups are present, these X groups may be same or different from each other, and may be cross-linked with the other X group, $E^1$, $E^2$ or Y;

Y is a Lewis base with the proviso that when a plurality of Y groups are present, these Y groups may be same or different from each other, and may be cross-linked with the other Y group, $E^1$, $E^2$ or X;

$A^1$ and $A^2$ are divalent cross-linking groups capable of bonding the two ligands $E^1$ and $E^2$ to each other which may be same or different from each other, and are independently a $C_1$ to $C_{20}$ hydrocarbon group, a $C_1$ to $C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein $R^1$ is a hydrogen atom, a halogen atom, a $C_1$ to $C_{20}$ hydrocarbon group or a $C_1$ to $C_{20}$ halogen-containing hydrocarbon group;

q is an integer of 1 to 5 given by the formula: [(valence of M)−2]; and r is an integer of 0 to 3, and (B) at least one component selected from the group consisting of (B-1) a compound capable of forming an ionic complex by reacting with said transition metal compound (A), and (B-2) aluminoxane.

In the above general formula (I), M represents a metal element belonging to Groups 3 to 10 or lanthanoid of the Period Table. Specific examples of the metal element M include titanium, zirconium, hafnium, yttrium, vanadium, chromium, manganese, nickel, cobalt, palladium and lanthanoid metals. Of these metal elements, preferred are titanium, zirconium and hafnium from the standpoint of a good catalytic activity for polymerization of olefins.

$E^1$ and $E^2$ are independently a ligand selected from the group consisting of substituted cyclopentadienyl, indenyl, substituted indenyl, heterocyclopentadienyl, substituted. heterocyclopentadienyl, amide group (—N<), phosphide group (—P<), hydrocarbon groups (>CR—, >C<) and silicon-containing groups (>SiR—, >Si<) wherein R is hydrogen, a $C_1$ to $C_{20}$ hydrocarbon group or a hetero atom-containing group, and form a cross-linked structure via $A^1$ and $A^2$.

The ligands $E^1$ and $E^2$ may be same or different from each other.

Of these ligands $E^1$ and $E^2$, preferred are substituted cyclopentadienyl, indenyl and substituted indenyl.

X represents a ligand capable of forming a σ-bond. When a plurality of X groups are present, these X groups may be same or different from each other, and may be cross-linked with the other X group, $E^1$, $E^2$ or Y.

Specific examples of the ligand X include a halogen atom, a $C_1$ to $C_{20}$ hydrocarbon group, $C_1$ to $C_{20}$ alkoxy, $C_6$ to $C_{20}$ aryloxy, a $C_1$ to $C_{20}$ amide group, a $C_1$ to $C_{20}$ silicon-containing group, a $C_1$ to $C_{20}$ phosphide group, a $C_1$ to $C_{20}$ sulfide group and $C_1$ to $C_{20}$ acyl.

Y represents a Lewis base. When a plurality of Y groups are present, these Y groups may be same or different from each other, and may be cross-linked with the other Y group, $E^1$, $E^2$ or X.

Specific examples of the Lewis base as Y include amines, ethers, phosphines and thioethers.

$A^1$ and $A^2$ are divalent cross-linking groups capable of bonding the two ligands to each other which may be same or different from each other, and are independently represent a $C_1$ to $C_{20}$ hydrocarbon group, a $C_1$ to $C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein $R^1$ is a hydrogen atom, a halogen atom, a $C_1$ to $C_{20}$ hydrocarbon group or a $C_1$ to $C_{20}$ halogen-containing hydrocarbon group.

The cross-linking groups include, for example, groups represented by the following general formula:

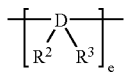

wherein D is carbon, silicon or tin; $R^2$ and $R^3$ are independently a hydrogen atom or a $C_1$ to $C_{20}$ hydrocarbon group, and may be same or different from each other and may be bonded to each other to form a ring; and e is an integer of 1 to 4. Specific examples of the cross-linking groups represented by the above formula include methylene, ethylene, ethylidene, propylidene, isopropylidene, cyclohexylidene, 1,2-cyclohexylene, vinylidene (CH$_2$=C=), dimethylsilylene, diphenylsilylene, methylphenylsilylene, dimethylgermylene, dimethylstannlylene, tetramethyldisilylene and diphenyldisilylene.

Of these cross-linking groups, preferred are ethylene, isopropylidene and dimethylsilylene. The symbol q is an integer of 1 to 5 given by the formula:

[(valence of M)–2], and r is an integer of 0 to 3.

Of these transition metal compounds represented by the above general formula (I), preferred are transition metal compounds having as a ligand, a double crosslinking type biscyclopentadienyl derivative represented by the following general formula (II):

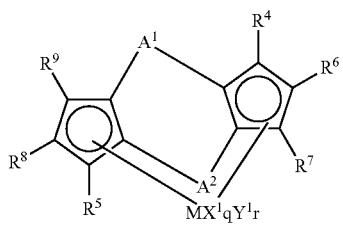

In the above general formula (II), M, $A^1$, $A^2$, q and r have the same definitions as described previously.

$X^1$ is a ligand capable of forming a σ-bond, and when a plurality of $X^1$ groups are present, these $X^1$ groups may be same or different from each other and may be cross-linked with the other $X^1$ group or $Y^1$.

Specific examples of the $X^1$ groups are the same as exemplified above with respect to X of the general formula (I).

$Y^1$ is a Lewis base, and when a plurality of $Y^1$ groups are present, these $Y^1$ groups may be same or different and may be cross-linked with the other $Y^1$ group or $X^1$.

Specific examples of the $Y^1$ groups are the same as exemplified above with respect to Y of the general formula (I).

$R^4$ to $R^9$ are independently a hydrogen atom, a halogen atom, a $C_1$ to $C_{20}$ hydrocarbon group, a $C_1$ to $C_{20}$ halogen-containing hydrocarbon group, a silicon-containing group or a hetero atom-containing group. However, at least one of $R^4$ to $R^9$ should be a group other than a hydrogen atom.

Also, $R^4$ to $R^9$ may be same or different from each other, and adjacent two groups thereof may be bonded to each other to form a ring.

In particular, $R^6$ and $R^7$ as well as $R^8$ and $R^9$ are preferably bonded to each other to form a ring.

$R^4$ and $R^5$ are preferably groups containing a hetero atom such as oxygen, halogen and silicon, because these groups exhibit a high polymerization activity.

The transition metal compound containing double crosslinking type biscyclopentadienyl derivatives as ligands preferably contains silicon in the crosslinking group between the ligands.

Specific examples of the transition metal compounds represented by the general formula (I) include (1,2'-ethylene)(2,1'-ethylene)-bis(indenyl)zirconium dichloride, (1,2'-methylene)(2,1'-methylene)-bis(indenyl)zirconium dichloride, (1,2'-isopropylidene)(2,1'-isopropylidene)-bis(indenyl)zirconium dichloride, (1,2'-ethylene)(2,1'-ethylene) -bis(3-methylindenyl)zirconium dichloride, (1,2'-ethylene)(2,1'-ethylene) -bis(4,5-benzoindenyl)zirconium dichloride, (1,2'-ethylene)(2,1'-ethylene) -bis(4-isopropylindenyl)zirconium dichloride, (1,2'-ethylene)(2,1'-ethylene) -bis(5,6-dimethylindenyl)zirconium dichloride, (1,2'-ethylene)(2,1'-ethylene)-bis(4,7-diisopropylindenyl)zirconium dichloride, (1,2'-ethylene)(2,1'-ethylene) -bis(4-phenylindenyl)zirconium dichloride, (1,2'-ethylene)(2,1'-ethylene) -bis(3-methyl-4-isopropylindenyl)zirconium dichloride, (1,2'-ethylene)(2,1'-ethylene)-bis(5,6-benzoindenyl)zirconium dichloride, (1,2'-ethylene)(2,1'-isopropylidene)-bis(indenyl)zirconium dichloride, (1,2'-methylene)(2,1'-ethylene) -bis(indenyl)zirconium dichloride, (1,2'-methylene)(2,1'-isopropylidene)-bis(indenyl)zirconium dichloride, (1,2'-dimethylsilylene)(2,1'-dimethylsilylene)-bis(indenyl)zirconium dichloride, (1,2'-dimethylsilylene)(2,1'-dimethylsilylene)-bis(3-methylindenyl)zirconium dichloride, (1,2'-dimethylsilylene)(2,1'-dimethylsilylene)-bis(3-n-butylindenyl)zirconium dichloride, (1,2'-dimethylsilylene)(2,1'-dimethylsilylene)-bis(3-i-propylindenyl)zirconium dichloride, (1,2'-dimethylsilylene)(2,1'-dimethylsilylene)-bis(3-trimethylsilylmethylindenyl) zirconium dichloride, (1,2'-dimethylsilylene)(2,1'-dimethylsilylene)-bis(3-phenylindenyl)zirconium dichloride, (1,2'-dimethylsilylene)(2,1'-dimethylsilylene)-bis(4,5-benzoindenyl)zirconium dichloride, (1,2'-dimethylsilylene)(2,1'-dimethylsilylene)-bis(4-isopropylindenyl)zirconium dichloride, (1,2'-dimethylsilylene)(2,1'-dimethylsilylene)-bis(5,6-dimethylindenyl)zirconium dichloride, (1,2'-dimethylsilylene)(2,1'-dimethylsilylene)-bis(4,7-di-i-propylindenyl)zirconium dichloride, (1,2'-dimethylsilylene)(2,1'-dimethylsilylene)-bis(4-phenylindenyl) zirconium dichloride, (1,2'-dimethylsilylene)(2,1'-dimethylsilylene)-bis(3-methyl-4-i-propylindenyl) zirconium dichloride, (1,2'-dimethylsilylene)(2,1'-dimethylsilylene)-bis(5,6-benzoindenyl)zirconium dichloride, (1,2'-dimethylsilylene)(2,1'-isopropylidene)-bis (indenyl)zirconium dichloride, (1,2'-dimethylsilylene)(2,1'-isopropylidene)-bis(3-methylindenyl)zirconium dichloride, (1,2'-dimethylsilylene)(2,1'-isopropylidene)-bis(3-i-propylindenyl)zirconium dichloride, (1,2'-dimethylsilylene)(2,1'-isopropylidene)-bis(3-n-butylindenyl)zirconium dichloride, (1,2'-dimethylsilylene)(2,1'-isopropylidene)-bis(3-trimethylsilylmethylindenyl)zirconium dichloride, (1,2'-dimethylsilylene)(2,1'-isopropylidene)-bis(3-trimethylsilylindenyl)zirconium dichloride, (1,2'-dimethylsilylene)(2,1'-isopropylidene)-bis(3-phenylindenyl)zirconium dichloride, (1,2'-dimethylsilylene)(2,1'-methylene)-bis(indenyl)zirconium dichloride, (1,2'-dimethylsilylene)(2,1'-methylene)-bis(3-methylindenyl)zirconium dichloride, (1,2'-dimethylsilylene)(2,1'-methylene)-bis(3-i-propylindenyl)zirconium dichloride, (1,2'-dimethylsilylene)(2,1'-methylene)-bis(3-n-butylindenyl)zirconium dichloride, (1,2'-dimethylsilylene)(2,1'-methylene)-bis(3-trimethylsilylmethylindenyl)zirconium dichloride, (1,2'-dimethylsilylene)(2,1'-methylene)-bis(3-trimethylsilylindenyl)zirconium dichloride, (1,2'-diphenylsilylene)(2,1'-methylene)-bis(indenyl)zirconium dichloride, (1,2'-diphenylsilylene)(2,1'-methylene)-bis(3-methylindenyl)zirconium dichloride, (1,2'-diphenylsilylene)(2,1'-methylene)-bis(3-i-propylindenyl)zirconium dichloride, (1,2'-diphenylsilylene)(2,1'-methylene)-bis(3-n-butylindenyl)zirconium dichloride, (1,2'-diphenylsilylene)(2,1'-methylene)-bis(3-trimethylsilylmethylindenyl)zirconium dichloride, (1,2'-diphenylsilylene)(2,1'-methylene)-bis(3-trimethylsilylindenyl)zirconium dichloride, (1,2'-dimethylsilylene)(2,1'-dimethylsilylene)(3-methylcyclopentadienyl)(3'-methylcyclopentadienyl)zirconium dichloride, (1,2'-dimethylsilylene)(2,1'-isopropylidene)(3-methylcyclopentadienyl)(3'-methylcyclopentadienyl)zirconium dichloride, (1,2'-dimethylsilylene)(2,1'-ethylene)(3-methylcyclopentadienyl)(3'-methylcyclopentadienyl)zirconium dichloride, (1,2'-ethylene)(2,1'-methylene)(3-methylcyclopentadienyl)(3'-methylcyclopentadienyl)zirconium dichloride, (1,2'-ethylene)(2,1'-isopropylidene)(3-methylcyclopentadienyl)(3'-methylcyclopentadienyl)zirconium dichloride, (1,2'-methylene)(2,1'-methylene)(3-methylcyclopentadienyl)(3'-methylcyclopentadienyl)zirconium dichloride, (1,2'-methylene)(2,1'-isopropylidene)(3-methylcyclopentadienyl)(3'-methylcyclopentadienyl)zirconium dichloride, (1,2'-isopropylidene)(2,1'-isopropylidene)(3-methylcyclopentadienyl)(3'-methylcyclopentadienyl)zirconium dichloride, (1,2'-dimethylsilylene)(2,1'-dimethylsilylene)(3,4-dimethylcyclopentadienyl)(3',4'-dimethylcyclopentadienyl)zirconium dichloride, (1,2'-dimethylsilylene)(2,1'-isopropylidene)(3,4-dimethylcyclopentadienyl)(3',4'-dimethylcyclopentadienyl)zirconium dichloride, (1,2'-dimethylsilylene)(2,1'-ethylene)(3,4-dimethylcyclopentadienyl)(3',4'-dimethylcyclopentadienyl)zirconium dichloride, (1,2'-ethylene)(2,1'-methylene)(3,4-dimethylcyclopentadienyl)(3',4'-dimethylcyclopentadienyl)zirconium dichloride, (1,2'-ethylene)(2,1'-isopropylidene)(3,4-dimethylcyclopentadienyl)(3',4'-dimethylcyclopentadienyl)zirconium dichloride, (1,2'-methylene)(2,1'-methylene)(3,4-dimethylcyclopentadienyl)(3',4'-dimethylcyclopentadienyl)zirconium dichloride, (1,2'-methylene)(2,1'-isopropylidene)(3,4-dimethylcyclopentadienyl)(3',4'-dimethylcyclopentadienyl)zirconium dichloride, (1,2'-isopropylidene)(2,1'-isopropylidene)(3,4-dimethylcyclopentadienyl)(3',4'-dimethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-ethylcyclopentadienyl)(3'-methyl-5'-ethylcyclopentadienyl)zirconium dichloride, (1,2'-dimethylsilylene)(2,1'-dimethylsilylene)(3-methyl-5-isopropylcyclopentadienyl)(3'-methyl-5'-isopropylcyclopentadienyl)zirconium dichloride, (1,2'-dimethylsilylene)(2,1'-dimethylsilylene)(3-methyl-5-n-butylcyclopentadienyl)(3'-methyl-5'-n-butylcyclopentadienyl)zirconium dichloride, (1,2'-dimethylsilylene)(2,1'-dimethylsilylene)(3-methyl-5-phenylcyclopentadienyl)(3'-methyl-5'-phenylcyclopentadienyl)zirconium dichloride, (1,2'-dimethylsilylene)(2,1'-isopropylidene)(3-methyl-5-ethylcyclopentadienyl)(3'-methyl-5'-ethylcyclopentadienyl)zirconium dichloride, (1,2'-dimethylsilylene)(2,1'-isopropylidene)(3-methyl-5-i-propylcyclopentadienyl)(3'-methyl-5'-i-propylcyclopentadienyl)zirconium dichloride, (1,2'-dimethylsilylene)(2,1'-isopropylidene)(3-methyl-5-n-butylcyclopentadienyl)(3'-methyl-5'-n-butylcyclopentadienyl)zirconium dichloride, (1,2'-dimethylsilylene)(2,1'-isopropylidene)(3-methyl-5-phenylcyclopentadienyl)(3'-methyl-5'-phenylcyclopentadienyl)zirconium dichloride, (1,2'-dimethylsilylene)(2,1'-ethylene)(3-methyl-5-ethylcyclopentadienyl)(3'-methyl-5'-ethylcyclopentadienyl)zirconium dichloride, (1,2'-dimethylsilylene)(2,1'-ethylene)(3-methyl-5-i-propylcyclopentadienyl)(3'-methyl-5'-i-propylcyclopentadienyl)zirconium dichloride, (1,2'-dimethylsilylene)(2,1'-ethylene)(3-methyl-5-n-butylcyclopentadienyl)(3'-methyl-5'-n-butylcyclopentadienyl)zirconium dichloride, (1,2'-dimethylsilylene)(2,1'-ethylene)(3-methyl-5-phenylcyclopentadienyl)(3'-methyl-5'-phenylcyclopentadienyl)zirconium dichloride, (1,2'-dimethylsilylene)(2,1'-methylene)(3-methyl-5-ethylcyclopentadienyl)(3'-methyl-5'-ethylcyclopentadienyl)zirconium dichloride, (1,2'-dimethylsilylene)(2,1'-methylene)(3-methyl-5-i-propylcyclopentadienyl)(3'-methyl-5'-i-propylcyclopentadienyl)zirconium dichloride, (1,2'-dimethylsilylene)(2,1'-methylene)(3-methyl-5-n-butylcyclopentadienyl)(3'-methyl-5'-n-butylcyclopentadienyl)zirconium dichloride, (1,2'-dimethylsilylene)(2,1'-methylene)(3-methyl-5-phenylcyclopentadienyl)(3'-methyl-5'-phenylcyclopentadienyl)zirconium dichloride, (1,2'-ethylene)(2,1'-methylene)(3-methyl-5-i-propylcyclopentadienyl)(3'-methyl-5'-i-propylcyclopentadienyl)zirconium dichloride, (1,2'-ethylene)(2,1'-isopropylidene)(3-methyl-5-i-propylcyclopentadienyl)(3'-methyl-5'-i-propylcyclopentadienyl)zirconium dichloride, (1,2'-methylene)(2,1'-methylene)(3-methyl-5-i-propylcyclopentadienyl)(3'-methyl-5'-i-propylcyclopentadienyl)zirconium dichloride, (1,2'-methylene)(2,1'-isopropylidene)(3-methyl-5-i-propylcyclopentadienyl)(3'-methyl-5'-i-propylcyclopentadienyl)zirconium dichloride, (1,1'-dimethylsilylene)(2,2'-dimethylsilylene)bisindenyl zirconium dichloride, (1,1'-diphenylsilylene)(2,2'-dimethylsilylene)bisindenyl zirconium dichloride, (1,1'-diisopropylsilylene)(2,2'-dimethylsilylene)bisindenyl zirconium dichloride, (1,1'-dimethylsilylene)(2,2'-diisopropylsilylene)bisindenyl zirconium dichloride, (1,2'-dimethylsilylene)(2,1'-dimethylsilylene)(indenyl)(3-trimethylsilylindenyl)zirconium dichloride, (1,2'-diphenylsilylene)(2,1'-diphenylsilylene)(indenyl)(3-trimethylsilylindenyl)zirconium dichloride, (1,2'-diphenylsilylene)(2,1'-dimethylsilylene)(indenyl)(3-trimethylsilylindenyl)zirconium dichloride, (1,2'-dimethylsilylene)(2,1'-diphenylsilylene)(indenyl)(3-trimethylsilylindenyl)zirconium dichloride, (1,2'-diisopropylsilylene)(2,1'-dimethylsilylene)(indenyl)(3-trimethylsilylindenyl)zirconium dichloride, (1,2'-dimethylsilylene)(2,1'-diisopropylsilylene)(indenyl)(3-trimethylsilylindenyl)

zirconium dichloride, (1,2'-diisopropylsilylene)(2,1'-diisopropylsilylene)(indenyl)(3-trimethylsilylindenyl)zirconium dichloride, (1,2'-dimethylsilylene)(2,1'-dimethylsilylene)(indenyl)(3-trimethylsilylmethylindenyl)zirconium dichloride, (1,2'-diphenylsilylene)(2,1'-diphenylsilylene)(indenyl)(3-trimethylsilylmethylindenyl)zirconium dichloride, (1,2'-diphenylsilylene)(2,1'-dimethylsilylene)(indenyl)(3-trimethylsilylmethylindenyl)zirconium dichloride, (1,2'-dimethylsilylene)(2,1'-diphenylsilylene)(indenyl)(3-trimethylsilylmethylindenyl)zirconium dichloride, (1,2'-diisopropylsilylene)(2,1'-dimethylsilylene)(indenyl)(3-trimethylsilylmethylindenyl)zirconium dichloride, (1,2'-dimethylsilylene)(2,1'-diisopropylsilylene)(indenyl)(3-trimethylsilylmethylindenyl)zirconium dichloride and (1,2'-diisopropylsilylene)(2,1'-diisopropylsilylene)(indenyl)(3-trimethylsilylmethylindenyl)zirconium dichloride, as well as compounds obtained by replacing zirconium of the above-described compounds with titanium or hafnium, though are not limited thereto.

In addition, similar compounds containing metal elements belonging to the other Groups or lanthanoid series may also be used in the present invention.

Also, in the above-described compounds, the (1,1'-) (2.2'-) substituted compounds may be replaced with (1,2'-) (2.1'-) substituted compounds, and the (1,2'-) (2.1'-) substituted compounds may be replaced with (1,1'-) (2.2'-) substituted compounds.

Among the component (B), the component (B-1) may be selected from any suitable compounds as long as they are capable of forming an ionic complex by reacting with the above transition metal compound (A). Suitable compounds usable as the component (B-1) include coordination complex compounds or Lewis acids composed of an anion and a cation containing a plurality of groups bonded to a metal element.

As the coordination complex compounds composed of an anion and a cation containing a plurality of groups bonded to a metal element, there may be used various compounds. Examples of the coordination complex compounds suitably used in the present invention include those compounds represented by the following general formulae (III) and (IV):

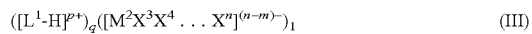

$$([L^1-H]^{p+})_q([M^2X^3X^4 \ldots X^n]^{(n-m)-})_l \quad (III)$$

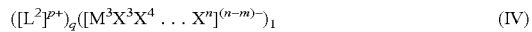

$$([L^2]^{p+})_q([M^3X^3X^4 \ldots X^n]^{(n-m)-})_l \quad (IV)$$

wherein $L^1$ represents a Lewis base; $L^2$ represents $M^4$, $R^{10}R^{11}M^5$ or $R^{12}{}_3C$ as defined later; $M^2$ and $M^3$ are respectively a metal selected from the group consisting of elements belonging to Groups 5 to 15 of the Periodic Table; $M^4$ is a metal selected from the group consisting of elements belonging to Group 1 and Groups 8 to 12 of the Periodic Table; $M^5$ is a metal selected from the group consisting of elements belonging to Groups 8 to 10 of the Periodic Table; $X^3$ to $X^n$ are respectively a hydrogen atom, dialkylamino, alkoxy, aryloxy, $C_1$ to $C_{20}$ alkyl, $C_6$ to $C_{20}$ aryl, alkylaryl, arylalkyl, substituted alkyl, an organometalloid group or a halogen atom; $R^{10}$ and $R^{11}$ are respectively cyclopentadienyl, substituted cyclopentadienyl, indenyl or fluorenyl; $R^{12}$ is alkyl; m represents a valence of $M^2$ or $M^3$ and is an integer of 1 to 7; n is an integer of 2 to 8; p represents an ionic valence of $L^1$-H or $L^2$ and is an integer of 1 to 7; q is an integer of 1 or more; l is a number of q×p/(n−m).

$M^2$ and $M^3$ are respectively a metal selected from the group consisting of elements belonging to Groups 5 to 15 of the Periodic Table, preferably elements belonging to Groups 13 to 15 of the Periodic Table and more preferably a boron atom.

$M^4$ is a metal selected from the group consisting of elements belonging to Group 1 and Groups 8 to 12 of the Periodic Table. Specific examples of the $M^4$ include respective atoms such as Ag, Cu, Na and Li. $M^5$ is a metal selected from the group consisting of elements belonging to Groups 8 to 10 of the Periodic Table. Specific examples of the $M^5$ include respective atoms such as Fe, Co and Ni.

Specific examples of the $X^3$ to $X^n$ include dialkylamino groups such as dimethylamino and diethylamino; alkoxy groups such as methoxy, ethoxy and n-butoxy; aryloxy groups such as phenoxy, 2,6-dimethylphenoxy and naphthyloxy; $C_1$ to $C_{20}$ alkyl groups such as methyl, ethyl, n-propyl, isopropyl, n-butyl, n-octyl and 2-ethylhexyl; $C_6$ to $C_{20}$ aryl, alkylaryl or arylalkyl groups such as phenyl, p-tolyl, benzyl, pentafluorophenyl, 3,5-di(trifluoromethyl)phenyl, 4-tert-butylphenyl, 2,6-dimethylphenyl, 3,5-dimethylphenyl, 2,4-dimethylphenyl and 1,2-dimethylphenyl; halogen atoms such as F, Cl, Br and I; and organometalloid groups such as pentamethyl antimony, trimethylsilyl, trimethylgermyl, diphenyl arsine, dicyclohexyl antimony and diphenyl boron.

Specific examples of the substituted cyclopentadienyl groups as $R^{10}$ and $R^{11}$ include methylcyclopentadienyl, butylcyclopentadienyl and pentamethylcyclopentadienyl.

Specific examples of the anion containing a plurality of groups bonded to a metal element include $B(C_6F_5)_4^-$, $B(C_6HF_4)_4^-$, $B(C_6H_2F_3)_4^-$, $B(C_6H_3F_2)_4^-$, $B(C_6H_4F)_4^-$, $B(C_6(CF_3)F_4)_4^-$, $B(C_6H_5)_4^-$ and $BF_4^-$. Specific examples of the metal cation include $Cp_2Fe^+$, $(MeCp)_2Fe^+$, $(tBuCp)_2Fe^+$, $(Me_2Cp)_2Fe^+$, $(Me_3Cp)_2Fe^+$, $(Me_4Cp)_2Fe^+$, $(Me_5Cp)_2Fe^+$, $Ag^+$, $Na^+$ and $Li^+$. Examples of the other cations include nitrogen-containing compounds such as pyridinium, 2,4-dinitro-N,N-diethyl anilinium, diphenyl ammonium, p-nitroanilinium, 2,5-dichloroanilinium, p-nitro-N,N-dimethyl anilinium, quinolinium, N,N-dimethyl anilinium and N,N-diethyl anilinium; carbenium compounds such as triphenyl carbenium, tri(4-methylphenyl)carbenium and tri(4-methoxyphenyl)carbenium; alkyl phosphonium ions such as $CH_3PH_3^+$, $C_2H_5PH_3^+$, $C_3H_7PH_3^+$, $(CH_3)_2PH_2^+$, $(C_2H_5)_2PH_2^+$, $(C_2H_7)_2PH_2^+$, $(CH_3)_3PH^+$, $(C_2H_5)_3PH^+$, $(C_3H_6)_7PH^+$, $(CF_3)_3PH^+$, $(CH_3)_4P^+$, $(C_2H_5)_4P^+$ and $(C_3H_7)_4P^+$; and aryl phosphonium ions such as $C_6H_5PH_3^+$, $(C_6H_5)_2PH_2^+$, $(C_6H_5)_3PH^+$, $(C_6H_5)_4P^+$, $(C_2H_5)_2(C_6H_5)PH^+$, $(CH_3)(C_6H_5)PH_2^+$, $(CH_3)_2(C_6H_5)PH^+$ and $(C_2H_5)_2(C_6H_5)_2P^+$.

In the present invention, there may be used coordination complex compounds composed of an optional combination of the above metal cations and anions.

Specifically, of the compounds represented by the general formulae (III) and (IV), there may be suitably used the following compounds.

Examples of the compounds represented by the general formula (III) include triethyl ammonium tetraphenylborate, tri(n-butyl)ammonium tetraphenylborate, trimethyl ammonium tetraphenylborate, triethyl ammonium tetrakis(pentafluorophenyl)borate, tri(n-butyl)ammonium tetrakis(pentafluorophenyl)borate, triethyl ammonium hexafluoroarsenate, pyridinium tetrakis(pentafluorophenyl)borate, pyrrolinium tetrakis(pentafluorophenyl)borate, N,N-dimethyl anilinium tetrakis(pentafluorophenyl)borate and methyldiphenyl ammonium tetrakis(pentafluorophenyl)borate.

Whereas, examples of the compounds represented by the general formula (IV) include ferrocenium tetraphenylborate, dimethyl ferrocenium tetrakis(pentafluorophenyl)borate, ferrocenium tetrakis(pentafluorophenyl)borate, decamethyl ferrocenium tetrakis(pentafluorophenyl)borate, acetyl ferrocenium tetrakis(pentafluorophenyl)borate, formyl ferrocenium tetrakis(pentafluorophenyl)borate, cyano-ferrocenium tetrakis(pentafluorophenyl)borate, silver tetraphenylborate, silver tetrakis(pentafluorophenyl)borate, trityl tetraphenylborate, trityl tetrakis(pentafluorophenyl)borate and silver tetrafluoroborate.

The suitable coordination complex compounds are those composed of a non-coordinated anion and a substituted triaryl carbenium. Examples of the non-coordinated anion include anions represented by the following genera formula (V):

$$(M^1X^2X^3 \ldots X^n)^{(n-m)-} \qquad (V)$$

wherein $M^1$ is an element selected from the group consisting of elements belonging to Groups 5 to 15 of the Periodic Table, preferably Groups 13 to 15 of the Periodic Table and more preferably a boron atom; $X^2$ to $X^n$ are respectively a hydrogen atom, dialkylamino, alkoxy, aryloxy, $C_1$ to $C_{20}$ alkyl, $C_6$ to $C_{20}$ aryl (including halogen-substituted aryl), alkylaryl, arylalkyl, substituted alkyl, an organometalloid group or a halogen atom; m is a valence of $M^1$; and n is an integer of 2 to 8.

Further, as the non-coordinated anion, there maybe used compounds generally called "carborane".

Also, examples of the substituted triaryl carbenium include cations represented by the following general formula (VI):

$$[CR^{13}R^{14}R^{15}]^+ \qquad (VI)$$

In the above general formula (VI), $R^{13}$, $R^{14}$ and $R^{15}$ are respectively an aryl group such as phenyl, substituted phenyl, naphthyl and anthracenyl, and may be same or different from each other with the proviso that at least one of $R^{13}$, $R^{14}$ and $R^{15}$ is substituted phenyl, naphthyl or anthracenyl.

Examples of the substituted phenyl include groups represented by the following general formula (VII):

$$C_6H_{5-k}R^{16}_k \qquad (VII)$$

In the above general formula (VII), $R^{16}$ is $C_1$ to $C_{10}$ hydrocarbyl, alkoxy, aryloxy, thioalkoxy, thioaryloxy, amino, amido, carboxyl or a halogen atom; and k is an integer of 1 to 5.

When k is 2 or more, a plurality of the $R^{16}$ groups may be same or different from each other.

Specific examples of the non-coordinated anion represented by the general formula (V) include tetra(fluorophenyl)borate, tetrakis(difluorophenyl)borate, tetrakis(trifluorophenyl)borate, tetrakis(tetrafluorophenyl)borate, tetrakis(pentafluorophenyl)borate, tetrakis(trifluoromethylphenyl)borate, tetra(toluyl)borate, tetra(xylyl)borate, (triphenyl, pentafluorophenyl)borate, [tris(pentafluorophenyl), phenyl]borate and tridecahydride-7,8-dicarbaundecaborate.

Specific examples of the substituted triaryl carbenium represented by the above general formula (VI) include tri(toluyl)carbenium, tri(methoxyphenyl)carbenium, tri(chlorophenyl)carbenium, tri(fluorophenyl)carbenium, tri(xylyl)carbenium,[di(toluyl), phenyl]carbenium, [di(methoxyphenyl), phenyl]carbenium, [di(chlorophenyl), phenyl]carbenium, [toluyl, di(phenyl)]carbenium, [methoxyphenyl, di(phenyl)]carbenium and [chlorophenyl, di(phenyl)]carbenium.

In addition, as the component (B-1) used in the catalyst of the present invention, there may also be used compounds represented by the following general formula (VIII):

$$BR^{17}R^{18}R^{19} \qquad (VIII)$$

wherein $R^{17}$, $R^{18}$ and $R^{19}$ are respectively $C_1$ to $C_{20}$ alkyl or $C_6$ to $C_{20}$ aryl. Namely, any of the boron compounds containing alkyl or aryl substituent groups bonded to boron may be used as the component (B-1) without any particular limitations.

The alkyl group may also include halogen-substituted alkyl groups, and the aryl group may also include halogen-substituted aryl groups and alkyl-substituted aryl groups.

Thus, $R^{17}$, $R^{18}$ and $R^{19}$ in the above general formula (VIII) respectively represent $C_1$ to $C_{20}$ alkyl or $C_6$ to $C_{20}$ aryl. Specific examples of the alkyl and aryl groups include alkyl groups such as methyl, ethyl, propyl, butyl, amyl, isoamyl, isobutyl, octyl and 2-ethylhexyl; and aryl groups such as phenyl, fluorophenyl, tolyl, xylyl and benzyl.

Meanwhile, $R^{17}$, $R^{18}$ and $R^{19}$ may be same or different from each other.

Specific examples of the compounds represented by the above general formula (VIII) include triphenyl boron, tri(pentafluorophenyl)boron, tri(2,3,4,5-tetrafluorophenyl)boron, tri(2,4,5,6-tetrafluorophenyl)boron, tri(2,3,5,6-tetrafluorophenyl)boron, tri(2,4,6-trifluorophenyl)boron, tri(3,4,5-trifluorophenyl)boron, tri(2,3,4-trifluorophenyl)boron, tri(3,4,6-trifluorophenyl)boron, tri(2,3-difluorophenyl)boron, tri(2,6-difluorophenyl)boron, tri(3,5-difluorophenyl)boron, tri(2,5-difluorophenyl)boron, tri(2-fluorophenyl)boron, tri(3-fluorophenyl)boron, tri(4-fluorophenyl)boron, tri[3,5-di(trifluoromethyl)phenyl]boron, tri[(4-fluoromethyl)phenyl]boron, diethyl boron, diethylbutyl boron, trimethyl boron, triethyl boron, tri(n-butyl)boron, tri(fluoromethyl)boron, tri(pentafluoroethyl)boron, tri(nonafluorobutyl)boron, tri(2,4,6-trifluorophenyl)boron, tri(3,5-difluorophenyl)boron, di(pentafluorophenyl) fluoroboron, diphenyl fluoroboron, di(pentafluorophenyl)chloroboron, dimethyl fluoroboron, diethyl fluoroboron, di(n-butyl)fluoroboron, (pentafluorophenyl)difluoroboron, phenyl fluoroboron, (pentafluorophenyl)dichloroboron, methyl difluoroboron, ethyl difluoroboron and (n-butyl) difluoroboron.

Of these compounds, especially preferred is tri(pentafluorophenyl)boron.

Examples of the aluminoxanes as the component (B-2) include chain-like aluminoxanes represented by the following general formula (IX):

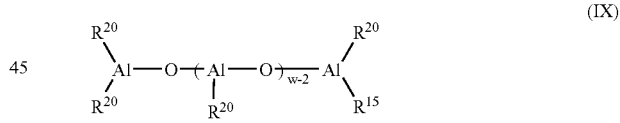

wherein $R^{20}$ is a hydrocarbon group such as $C_1$ to $C_{20}$, preferably $C_1$ to $C_{12}$ alkyl, alkenyl, aryl and arylalkyl, or a halogen atom; w represents an average polymerization degree, i.e., an integer of usually 2 to 50 and preferably 2 to 40; the respective $R^{20}$ groups may be the same or different from each other, and cyclic aluminoxanes represented by the following general formula (X):

wherein $R^{20}$ and w are the same as defined above.

The above aluminoxanes may be produced by contacting alkyl aluminum with a condensing agent such as water. The contact method is not particularly limited, and the reaction may be conducted according to any known contact methods.

For example, the reaction may be conducted by (1) the method of dissolving the organoaluminum compound in an organic solvent, and then contacting the thus obtained solution with water; (2) the method of adding the organoaluminum compound at an initial stage of the polymerization, and then adding water thereto at a later stage of the polymerization; (3) the method of reacting crystal water contained in metal salts, etc., or water adsorbed in inorganic or organic substances, with the organoaluminum compound; and (4) the method of reacting tetraalkyl dialuminoxane with trialkyl aluminum, and then reacting the obtained reaction product with water.

The aluminoxanes may be insoluble in toluene.

These aluminoxanes may be used alone or in the form of a mixture of any two or more thereof.

When using the component (B-1) as the component (B), the molar ratio of the catalyst component (A) to the catalyst component (B-1) is preferably 10:1 to 1:100 and more preferably 2:1 to 1:10. If the molar ratio of the component (A) to the component (B-1) is out of the above-specified range, the cost performance of the catalyst per unit weight of the obtained polymer is deteriorated and therefore unpractical.

Also, when using the component (B-2) as the component (B), the molar ratio of the component (A) to the component (B-2) is preferably 1:1 to 1:1,000,000 and more preferably 1:10 to 1:10,000.

If the molar ratio of the component (A) to the component (B-2) is out of the above-specified range, the cost performance of the catalyst per unit weight of the obtained polymer is deteriorated and therefore unpractical.

The components (B-1) and (B-2) as the component (B) may be used alone or in the combination of any two or more thereof.

Further, the molar ratio of the component (A) to the component (B) used in the present invention is preferably 10:1 to 1:100 and more preferably 1:1 to 1:10. If the molar ratio of the component (A) to the component (B) is out of the above-specified range, the cost performance of the catalyst per unit weight of the obtained polymer is deteriorated and therefore unpractical.

In the process for production of the 1-butene-based polymer according to the aspect 1 of the present invention, when the polymerization catalyst is composed of the specific transition metal compound (A) and the compound (B-1) capable of forming an ionic complex by reacting with said transition metal compound (A), in particular, the boron-containing compound, the 1-butene-based polymer can be produced at an extremely high activity as compared to the case where the aluminoxane is used as the component (B-2).

Whereas, in the process for production of the 1-butene-based polymer according to the aspect 2 of the present invention, the use of the polymerization catalyst composed of the specific transition metal compound (A) and the aluminoxane as the component (B-2) is preferred.

The polymerization catalyst used in the production process of the present invention may further contain an organoaluminum compound as the component (C) in addition to the components (A) and (B).

As the organoaluminum compound (C), there may be used compounds represented by the general formula (XI):

$$R^{21}_{v}AlJ_{3-v} \qquad (XI)$$

wherein $R^{21}$ is $C_1$ to $C_{10}$ alkyl; J is a hydrogen atom, $C_1$ to $C_{20}$ alkoxy, $C_6$ to $C_{20}$ aryl or a halogen atom; and v is an integer of 1 to 3.

Specific examples of the compounds represented by the above general formula (XI) include trimethyl aluminum, triethyl aluminum, triisopropyl aluminum, triisobutyl aluminum, dimethyl aluminum chloride, diethyl aluminum chloride, methyl aluminum dichloride, ethyl aluminum dichloride, dimethyl aluminum fluoride, diisobutyl aluminum hydride, diethyl aluminum hydride and ethyl aluminum sesquichloride.

These organoaluminum compounds may be used alone or in the form of a mixture of any two or more thereof.

In the production process of the present invention, the above described components (A), (B) and (C) may be preliminarily contacted with each other.

The preliminary contact may be performed, for example, by contacting the component (B) with the component (A), but is not particularly limited and may be conducted by any known method.

The preliminary contact is effective to improve the catalytic activity, reduce the amount of the component (B) as a co-catalyst, and reduce the costs required for the catalyst.

Also, when the components (A) and (B) are contacted with each other, in addition to the above effects, there can be attained such an effect of increasing a molecular weight of the obtained polymer.

The preliminary contact temperature is usually in the range of −20 to 200° C., preferably −10 to 150° C. and more preferably 0 to 80° C.

The preliminary contact may also be conducted in the presence of an inert hydrocarbon solvent such as aliphatic hydrocarbons and aromatic hydrocarbons.

Of these solvents, especially preferred are aliphatic hydrocarbons.

The molar ratio of the catalyst component (A) to the catalyst component (C) is preferably in the range of from 1:1 to 1:10,000 and more preferably from 1:5 to 1:2,500.

When further using the component (C), the catalyst can be enhanced in polymerization activity per unit quantity of transition metal used. However, the use of a too large amount of the organoaluminum compound as the component (C) is uneconomical and rather tends to cause such a defect that a large amount of the component (C) remains in the obtained polymer.

In the present invention, at least one of the catalyst components may be supported on a suitable carrier.

The carrier usable in the present invention is not particularly limited, and may be appropriately selected from inorganic oxides, other inorganic materials and organic materials. Of these carriers, preferred are those made of inorganic oxides or other inorganic materials.

Specific examples of the inorganic oxides used as the carrier include $SiO_2$, $Al_2O_3$, MgO, $ZrO_2$, $TiO_2$, $Fe_2O_3$, $B_2O_3$, CaO, ZnO, BaO, $ThO_2$ or mixtures thereof such as silica-alumina, zeolite, ferrite and glass fibers.

Of these inorganic oxides, especially preferred are $SiO_2$ and $Al_2O_3$.

The carriers made of the inorganic oxides may further contain a small amount of carbonates, nitrates, sulfates or the like.

The other inorganic materials used as the carrier may include magnesium compounds such as typically $MgCl_2$ and $Mg(OC_2H_5)_2$, or complex salts thereof which are represented by the general formula:

$$MgR^{22}_xX^q_y$$

In the above formula, $R^{22}$ is $C_1$ to $C_{20}$ alkyl, $C_1$ to $C_{20}$ alkoxy or $C_6$ to $C_{20}$ aryl; $X^q$ is a halogen atom or $C_1$ to $C_{20}$ alkyl; x is a number of 0 to 2; and y is a number of 0 to 2 with the proviso that (x+y) is 2.

The $R^{22}$ groups and the $X^q$ groups may be respectively the same or different from each other.

Examples of the organic materials used as the carrier include polymers such as polystyrene, styrene-divinylbenzene copolymer, polyethylene, poly-1-butene, substituted polystyrene and polyarylates, starch, carbon or the like.

Of the above carriers, preferred are $MgCl_2$, $MgCl(OC_2H_5)$ and $Mg(OC_2H_5)_2$.

Although the properties of the carrier may vary depending upon kind and production method thereof, the carrier has an average particle size of usually 1 to 300 μm, preferably 10 to 200 μm and more preferably 20 to 100 μm.

The too small particle size of the carrier leads to increase in amount of fine powder contained in the polymer, and the too large particle size thereof leads to increase in amount of coarse particles contained in the polymer, resulting in reduced bulk density of the polymer or clogging of a hopper.

The carrier has a specific surface area of usually 1 to 1,000 $m^2/g$ and preferably 50 to 500 $m^2/g$, and a pore volume of usually 0.1 to 5 $m^3/g$ and preferably 0.3 to 3 $m^3/g$.

When the specific surface area or pore volume is out of the above-specified range, the catalyst activity tends to be deteriorated.

Meanwhile, the specific surface area and pore volume are determined, for example, from a volume of nitrogen gas absorbed as measured according to BET method.

Further, the carriers made of the inorganic oxides are preferably calcined at a temperature of usually 150 to 1,000° C. and preferably 200 to 800° C.

When at least one of the catalyst components is supported on the carrier, at least one of the catalyst components (A) and (B), preferably both thereof, may be supported thereon.

Said at least one of the catalyst components (A) and (B) may be supported on the carrier by any suitable method without particular limitations. For example, there may be used the following methods:

(1) Method of mixing at least one of the components (A) and (B) with the carrier;

(2) Method of treating the carrier with an organoaluminum compound or a halogen-containing silicon compound, and then mixing the thus-treated carrier with at least one of the components (A) and (B) in an inert solvent;

(3) Method of reacting the carrier, the component (A) and/or the component (B), and an organoaluminum compound or a halogen-containing silicon compound with each other;

(4) Method of supporting one of the component (A) and the component (B) on the carrier, and then mixing the carrier with the other remaining component;

(5) Method of mixing a reaction product obtained by contacting the component (A) with the component (B), with the carrier; and (6) Method of contacting the component (A) with the component (B) under the co-existence of the carrier to react with each other.

In the above methods (4), (5) and (6), the organoaluminum compound as the component (C) may be added to the reaction system.

The catalyst of the present invention may be prepared by irradiating an elastic wave on the components (A), (B) and (C) upon the contact therebetween.

As the elastic wave, there may be usually used a sound wave and more preferably an ultrasonic wave.

More specifically, the ultrasonic wave having a frequency of 1 to 1,000 kHz and preferably 10 to 500 kHz is preferably used.

The thus-obtained catalyst may be used in the polymerization in the form of a solid obtained after distilling off the solvent therefrom, or may be directly used in the polymerization.

Alternatively, in the present invention, the catalyst may be produced by supporting at least one of the component (A) and the component (B) on the carrier within the polymerization reaction system.

For example, after adding at least one of the component (A) and the component (B) together with the carrier and, if required, the organoaluminum compound as the optional component (C), olefin such as ethylene is added until reaching ordinary pressure to 2 MPa (gauge), and prepolymerized at a temperature of −20 to 200° C. for about 1 min to about 2 h to obtain catalyst particles.

In the present invention, the mass ratio of the component (B-1) to the carrier is preferably in the range of from 1:5 to 1:10,000 and more preferably from 1:10 to 1:500, and the mass ratio of the component (B-2) to the carrier is preferably in the range of from 1:0.5 to 1:1,000 and more preferably from 1:1 to 1:50.

When the component (B) is in the form of a mixture of any two or more kinds of components, the mass ratio of each component (B) to the carrier preferably lies within the above-specified ranges.

Also, the mass ratio of the component (A) to the carrier is preferably in the range of from 1:5 to 1:10,000 and more preferably from 1:10 to 1:500.

If the mass ratio of the component (B) (i.e., the component (B-1) or the component (B-2)) to the carrier, or the mass ratio of the component (A) to the carrier is out of the above-specified range, the catalytic activity of the obtained catalyst tends to be deteriorated.

The thus-prepared polymerization catalyst of the present invention has an average particle size of usually 2 to 200 μm, preferably 10 to 150 μm and more preferably 20 to 100 μm; and a specific surface area of usually 20 to 1,000 $m^2/g$ and preferably 50 to 500 $m^2/g$.

If the average particle size of the polymerization catalyst is less than 2 μm, the amount of fine powder contained in the obtained polymer tends to be increased. If the average particle size of the catalyst exceeds 200 μm, the amount of coarse particles contained in the obtained polymer tends to be increased.

If the specific surface area of the catalyst is less than 20 $m^2/g$, the catalytic activity thereof tends to be deteriorated. If the specific surface area of the catalyst exceeds 1,000 $m^2/g$, the obtained polymer tends to be lowered in bulk density.

Also, in the catalyst of the present invention, the amount of the transition metal per 100 g of the carrier is usually 0.05 to 10 g and preferably 0.1 to 2 g.

If the amount of the transition metal is out of the above-specified range, the catalytic activity of the catalyst tends to be lowered.

The use of the supported catalyst enables production of polymers having an industrially useful high bulk density and an excellent particle size distribution.

The 1-butene-based polymer of the present invention can be produced by homopolymerizing 1-butene, or copolymerizing 1-butene with ethylene and/or $C_3$ to $C_{20}$ α-olefin (except for 1-butene) in the presence of the above polymerization catalyst.

Examples of the $C_3$ to $C_{20}$ α-olefins include propylene, 1-pentene, 4-methyl-1-pentene, 1-hexene, 1-octene, 1-decene, 1-dodecene, 1-tetradecene, 1-hexadecene, 1-octadecene and 1-eicosene. In the present invention, these α-olefins may be used alone or in the form of a mixture of any two or more thereof.

The polymerization methods usable in the present invention are not particularly limited, and include slurry polymerization, vapor-phase polymerization, bulk polymerization, solution polymerization, suspension polymerization or the like. Of these methods, preferred are slurry polymerization and vapor-phase polymerization.

As to the polymerization conditions, the polymerization temperature is usually from −100 to 250° C., preferably from −50 to 200° C. and more preferably from 0 to 130° C.

Also, the amounts of the reactants and the catalyst used may be controlled such that the molar ratio of the raw monomers to the above component (A) is preferably in the range of 1 to $10^8$ and more preferably 100 to $10^5$.

Further, the polymerization time is usually from 5 min to 10 h, and the polymerization reaction pressure is preferably from ordinary pressure to 20 MPa (gauge) and more preferably from ordinary pressure to 10 MPa (gauge).

The molecular weight of the obtained polymer may be controlled by appropriately selecting kinds and amounts of respective catalyst components used and polymerization temperature, and further by conducting the polymerization in the presence of hydrogen.

Examples of solvents usable in the polymerization include aromatic hydrocarbons such as benzene, toluene, xylene and ethyl benzene; alicyclic hydrocarbons such as cyclopentane, cyclohexane and methyl cyclohexane; aliphatic hydrocarbons such as pentane, hexane, heptane and octane; and halogenated hydrocarbons such as chloroform and dichloromethane.

These solvent may be used alone or in the form of a mixture of any two or more thereof. Also, the monomers such as α-olefins may be used as the solvent.

Meanwhile, the polymerization may also be performed in the absence of a solvent.

Prior to the substantial polymerization, a preliminary polymerization may be conducted using the above polymerization catalyst.

The preliminary polymerization may be conducted by contacting the solid catalyst component with, for example, a small amount of olefins. The contact method is not particularly limited and may be any known method.

Also, the olefins usable in the preliminary polymerization are not particularly limited, and there may be used the above-described olefins, e.g., ethylene, $C_3$ to $C_{20}$ α-olefins or mixtures thereof. The olefins used in the preliminary polymerization are preferably identical to those used in the subsequent substantial polymerization.

The preliminary polymerization temperature is usually from −20 to 200° C., preferably from −10 to −130° C. and more preferably from 0 to 80° C.

The preliminary polymerization may be conducted in the presence of any suitable solvent such as aliphatic hydrocarbons, aromatic hydrocarbons and other monomers.

Of these solvents, preferred are aliphatic hydrocarbons.

Also, the preliminary polymerization may be conducted in the absence of a solvent.

The preliminary polymerization conditions may be suitably controlled such that the obtained preliminary polymerization product has an intrinsic viscosity [η] of 0.2 dL/g or higher and preferably 0.5 dL/g or higher as measured at 135° C. in decalin, and the yield of the preliminary polymerization product is 1 to 10,000 g and preferably 10 to 1,000 g per one millimole of the transition metal contained in the catalyst.

[3] 1-Butene-based Resin Modifier

The 1-butene-based resin modifier of the present invention is made of the 1-butene-based polymer according to the aspect 1 of the present invention.

The 1-butene-based resin modifier of the present invention can exhibit a low melting point, a good softness and a less stickiness, and can provide a molded article that are excellent in compatibility with polyolefin resins.

Namely, the 1-butene-based resin modifier of the present invention is composed of the specific 1-butene-based polymer and especially includes a slight amount of crystalline portions in poly-1-butene chain moieties thereof. As a result, the 1-butene-based resin modifier of the present invention exhibits a less stickiness and is excellent in compatibility as compared to conventional modifiers such as soft polyolefin resins.

Further, the 1-butene-based resin modifier of the present invention is excellent in compatibility with polyolefin-based resins, in particular, polypropylene-based resins.

As a result, the 1-butene-based resin modifier of the present invention is prevented from undergoing deteriorated surface properties such as stickiness, and exhibits a high transparency as compared to conventional modifiers such as ethylene-based rubbers.

In view of the above advantageous properties, the 1-butene-based resin modifier of the present invention can be suitably used as a modifier for improving properties such as flexibility and transparency.

Furthermore, the 1-butene-based resin modifier of the present invention may also be suitably used as a modifier for improving heat sealability and hot tackiness.

[4] Hot-melt Adhesive

The 1-butene-based polymer according to the aspect 2 of the present invention is suitably used as a base polymer for hot-melt adhesives, and is blended with a tackifier resin, a plasticizer, etc., to provide a polyolefin-based hot-melt adhesive that is excellent in thermal stability and fluidity under high temperature conditions, adhesion to low-polar substances, and heat resistance at a bonding surface.

Examples of the tackifier resin used in the polyolefin-based hot-melt adhesive using the 1-butene-based polymer according to the aspect 2 of the present invention as a base polymer, include rosin resins prepared from raw turpentine, terpene resins prepared from raw materials such as α-pinene and β-pinene obtained from pine essential oils, petroleum resins obtained by polymerizing unsaturated hydrocarbon-containing fractions by-produced upon thermal cracking of petroleum naphtha, and hydrogenated products thereof.

Examples of the commercially available tackifiers include "I-MARB P-125", "I-MARB P-100" and "I-MARB P-90" all available from Idemitsu Petrochemical Co., Ltd., "U-MEX" available from Sanyo Kasei Kogyo Co., Ltd., "HILET T1115" available from Mitsui Chemical Inc., "CLEARONE K100" available from Tonex Co., Ltd., "ARCON P100" available from Arakawa Chemical Co., Ltd., and "Regalrez 1078" available from Hercules Inc.

Meanwhile, the tackifier resins are preferably the hydrogenated products in view of compatibility with the 1-butene-based polymer.

Among the hydrogenated products, a hydrogenated petroleum resin that is superior in thermal stability is desirable.

In the present invention, various additives such as plasticizers, inorganic fillers and antioxidants may be blended in the 1-butene-based polymer, if required.

Examples of the plasticizers include paraffin-based process oils, polyolefin-based waxes, phthalic acid esters, adipic acid esters, aliphatic acid esters, glycols, epoxy-based high-molecular plasticizers and naphthene-based oils. Examples of the inorganic fillers include clay, talc, calcium carbonate and barium carbonate. Examples of the antioxidants include phosphoris-based antioxidants such as tris-nonylphenyl phosphite, distearylpentaerythritol diphosphite, "ADEKASTAB 1178" available from Asahi Denka Co., Ltd., "SUMIRISER TNP" available from Sumitomo Chemical Co., Ltd., "IRGAPHOS 168" available from Ciba Specialty Chemicals Corp., and "Sandstab P-EPQ" available from Sand Co., Ltd.; phenol-based anti-oxidants such as 2,6-di-t-butyl-4-methyl phenol, n-octadecyl-3-(3',5'-di-t-butyl-4'-hydroxyphenyl)propionate, "SUMIRISER BHT" available from Sumitomo Chemical Co., Ltd., and "IRGANOX 1010" available from Ciba Specialty Chemicals Corp.; and sulfur-based anti-oxidants such as dilauryl-3,3'-thiodipropionate, pentaerythritol tetrais(3-laurylthiopropionate), "SUMIRISER TPL" available from Sumitomo Chemical Co., Ltd., "YOSHINOX DLTP" available from Yoshitoini Seiyaku Co., Ltd., and "ANTIOX L" available from Nippon Yushi Co., Ltd.

The polyolefin-based hot-melt adhesives using the 1-butene-based polymer according to the aspect 2 of the present invention as a base polymer thereof may be used in various applications such as hygienic materials, packaging, book-making, fibers, wood-working, electric materials, tinning, building and bag-making.

The present invention will be described in more detail by reference to the following examples. However, it should be noted that the following examples are only illustrative and not intended to limit the invention thereto.

First, methods for evaluating resin properties of the 1-butene-based polymers obtained by the production process of the present invention are explained.

(1) Production of Press-molded Sheet (i) Preparation of Sample for Press-molding Forty grams of a 1-butene-based polymer was intimately mixed with 1,000 ppm of "IRGANOX 1010" available from Ciba Specialty Chemicals Corp., and 300 mL of toluene at 80° C. to prepare a uniform polymer solution.

The thus prepared 1-butene-based polymer solution was dried in a draft for 12 h, and then dried by a dryer at 60° C. to completely remove toluene therefrom, thereby obtaining a sample for press-molding.

(ii) Press-Molding Method

Twenty grams of the sample obtained in the above step (i) was pressed under a pressure of 50 kg/cm² at 150° C. for 10 min while taking care so as not to trap air bubbles therein, and thereafter gradually cooled to room temperature to obtain a press-molded sheet having a size of 200 mm×200 mm×1 mm.

(2) Measurement for Mesopentad Fraction, Abnormal Insertion Content and Stereoregularity Index Measured by the methods described in the present specification.

(3) Measurement for Comonomer Content

Measured by the method described in the present specification.

(4) Measurement for Intrinsic Viscosity [η]

The intrinsic viscosity of the polymer was measured at 135° C. in a tetralin solvent using an automatic viscometer "VMR-053 Model" available from Rigosha Co., Ltd.

(5) Measurement for Weight-Average Molecular Weight (Mw) and Molecular Weight Distribution (Mw/Mn)

Measured by the method described in the present specification.

(6) DSC Measurement (Measurement for Melting Point: Tm-D)

Measured by the method described in the present specification.

More specifically, using a differential scanning calorimeter "DSC-7" available from Perkiri Elmer Corp., 10 mg of a sample was held in a nitrogen atmosphere at −10° C. for 5 min, and then heated at a temperature rise rate of 10° C./min to prepare a melting endothermic curve thereof The melting point (Tm-D) was defined as a top of a peak observed on the highest-temperature side in the thus prepared melting endothermic curve.

Also, the melting endotherm as determined upon the above measurement was expressed by αH-D.

(7) Measurement for Tensile Modulus and Tensile Elongation at Break

A dumbbell-shaped specimen was prepared from the press-molded sheet obtained in the above (1), and subjected to a tensile test according to JIS K-7113 under the following condition.

Cross-head speed: 50 mm/min (8) Measurement for Zero-Shear Viscosity

Measured by the method described in the present specification.

EXAMPLE 1

(1) Production of Catalyst: Production of (1,2'-dimethylsilylene)(2,1'-dimethylsilylene)-bis(3-trimethylsilylmethylindenyl)zirconium dichloride A solution prepared by dissolving 3.0 g (6.97 mM) of a lithium salt of (1,2'-dimethylsilylene) (2,1'-dimethylsilylene)-bis(indene) in 50 mL of THF (tetrahydrofuran) was charged into a Schlenk's bottle, and cooled to −78° C.

Then, 2.1 mL (14.2 mM) of iodomethyl trimethylsilane was slowly dropped to the solution, and the mixture was stirred at room temperature for 12 h.

The resultant reaction solution was distilled to remove the solvent therefrom, and then after adding 50 mL of ether thereto, the reaction solution was washed with a saturated ammonium chloride solution.

An organic phase separated from the solution was dried to remove the solvent therefrom, thereby obtaining 3.04 g (5.88 mM) of (1,2'-dimethylsilylene)(2,1'-dimethylsilylene)-bis(3-trimethylsilylmethylindene) (yield:84%).

Next, a Schlenk's bottle was charged with 3.04 g (5.88 mM) of the thus obtained (1,2'-dimethylsilylene)(2,1'-dimethylsilylene)-bis(3-trimethylsilylmethylindene) and 50 mL of ether under a nitrogen flow.

After the contents of the bottle were cooled to −78° C., 7.6 mL of a hexane solution 1.54M/L, of n-BuLi (1.7 mM) was dropped thereto.

The temperature of the resultant mixture was raised to room temperature, and then stirred at room temperature for 12 h. Then, the ether was distilled away from the reaction mixture.

The thus obtained solid was washed with 40 mL of hexane to obtain 3.06 g (5.07 mM) of a lithium salt in the form of an ether adduct (yield: 73%).

The results of $^1$H-NMR (90 MHz, THF-$d_8$) measurement of the obtained product were as follows:

δ: 0.04 (s, 18H, trimethylsilyl); 0.48 (s, 12H, dimethylsilylene); 1.10 (t, 6H, methyl); 2.59 (s, 4H, methylene); 3.38 (q, 4H, methylene); 6.2-7.7 (m, 8H, Ar—H)

The thus obtained lithium salt was dissolved in 50 mL of toluene under a nitrogen flow.

After the resultant solution was cooled to −78° C., a suspension prepared by dispersing 1.2 g (5.1 mM) of zirconium tetrachloride in 20 mL of toluene which was previously cooled to −78° C., was dropped into the solution.

After completion of the dropping, the resultant mixture was stirred at room temperature for 6 h. The resultant reaction solution was distilled to remove the solvent therefrom.

The obtained distillation residue was recrystallized with dichloromethane, thereby obtaining 0.9 g (1.33 mM) of (1,2'-dimethylsilylene)(2,1'-dimethylsilylene)-bis(3-trimethylsilylmethylindenyl)zirconium dichloride (yield: 26%).

The results of $^1$H-NMR (90 MHz, CDCl$_3$) measurement of the obtained product were as follows:

δ: 0.0 (s, 18H, trimethylsilyl); 1.02, 1.12 (s, 12H, dimethylsilylene); 2.51 (dd, 4H, methylene); 7.1-7.6 (m, 8H, Ar—H)

(2) Polymerization

An one liter autoclave previously heat-dried was charged with 200 mL of heptane, 200 mL of 1-butene and 0.5 mM of triisobutyl aluminum, and then hydrogen was introduced into the autoclave until reaching 0.2 MPa.

After heating the contents of the autoclave to 65° C. while stirring, 0.8 μM of triphenyl carbenium tetrakispentafluorophenyl borate and 0.2 μM of (1,2'-dimethylsilylene)(2,1'-dimethylsilylene)-bis(3-trimethylsilylmethylindenyl)zirconium dichloride were added thereto, and the polymerization was conducted for 5 min.

After completion of the polymerization reaction, the resultant reaction product was dried under reduced pressure to obtain 13 g of a 1-butene polymer.

The resin properties and physical properties of the thus obtained 1-butene polymer were evaluated by the above-described methods. The results are shown in Table 1.

EXAMPLE 2

An one liter autoclave previously heat-dried was charged with 200 mL of heptane, 200 mL, of 1-butene and 0.5 mM of triisobutyl aluminum, and then hydrogen was introduced into the autoclave until reaching 0.3 MPa.

After heating the contents of the autoclave to 65° C. while stirring, propylene was further continuously introduced into the autoclave until a total pressure thereof reached 0.8 MPa. Then, 0.8 μM of triphenyl carbenium tetrakispentafluorophenyl borate and 0.2 μM of (1,2'-dimethylsilylene)(2,1'-dimethylsilylene)-bis(3-tri methylsilylmethylindenyl)zirconium dichloride were added to the autoclave, and the polymerization was conducted for 5 min.

After completion of the polymerization reaction, the resultant reaction product was dried under reduced pressure to obtain 14 g of a 1-butene copolymer.

The resin properties and physical properties of the thus obtained 1-butene copolymer were evaluated by the above-described methods. The results are shown in Table 1.

EXAMPLE 3

An one liter autoclave previously heat-dried was charged with 200 mL of heptane, 200 mL of 1-butene, 10 mL of 1-octene and 0.5 mM of triisobutyl aluminum, and then hydrogen was introduced into the autoclave until reaching 0.2 MPa.

After heating the contents of the autoclave to 65° C. while stirring, 2 μM of triphenyl carbenium tetrakispentafluorophenyl borate and 0.5 μM of (1,2'-dimethylsilylene)(2,1'-dimethylsilylene)-bis(3-trimethylsilylmethylindenyl)zirconium dichloride were added to the autoclave, and the polymerization was conducted for 5 min.

After completion of the polymerization reaction, the resultant reaction product was dried under reduced pressure to obtain 13 g of a 1-butene copolymer.

The resin properties and physical properties of the thus obtained 1-butene copolymer were evaluated by the above-described methods. The results are shown in Table 1.

EXAMPLE 4

A ten liter autoclave previously heat-dried was charged with 4 L of heptane and 2.5 kg of 1-butene, and then hydrogen was introduced. into the autoclave until reaching 0.2 MPa.

After heating the contents of the autoclave to 80° C. while stirring, , 5 mM of triisobutyl aluminum, 5 μM of (1,2'-dimethylsilylene)(2,1'-dimethylsilylene)-bis(3-trimethylsilylmethylindenyl)zirconium dichloride and 25 μM of dimethyl anilinium tetrakispentafluorophenyl borate were added to the autoclave, and the polymerization was conducted for 60 min.

After completion of the polymerization reaction, the resultant reaction product was dried under reduced pressure to obtain 1.2 kg of a 1-butene polymer.

The resin properties and physical properties of the thus obtained 1-butene polymer were evaluated by the above-described methods. The results are shown in Table 1.

EXAMPLE 5

A ten liter autoclave previously heat-dried was charged with 4 L of heptane and 2.5 kg of 1-butene, and then hydrogen was introduced into the autoclave until reaching 0.03 MPa.

After heating the contents of the autoclave to 80° C. while stirring, 5 mM of triisobutyl aluminum, 10 μM of (1,2'-dimethylsilylene)(2,1'-dimethylsilylene)(3-trimethylsilylmethylindenyl)(indenyl)zirconium dichloride and 50 μM of dimethyl anilinium tetrakispentafluorophenyl borate were added to the autoclave, and the polymerization was conducted for 40 min.

After completion of the polymerization reaction, the resultant reaction product was dried under reduced pressure to obtain 13 kg of a 1-butene polymer.

The resin properties and physical properties of the thus obtained 1-butene polymer were evaluated by the above-described methods. The results are shown in Table 1.

COMPARATIVE EXAMPLE 1

The same procedure as in EXAMPLE 1 was repeated except for replacing 0.8 μM of triphenyl carbenium tetrakispentafluorophenyl borate with 0.25 mM of methyl aluminoxane, and using (1,2'-dimethylsilylene)(2,1'-dimethylsilylene)-bis(3-trimethylsilylindenyl)zirconium dichloride in an amount of 0.25 μM. The polymerization reaction was conducted for 30 min, and the resultant reaction product was dried in the same manner as in EXAMPLE 1, thereby obtaining 10 g of a 1-butene polymer.

The resin properties and physical properties of the thus obtained 1-butene polymer were evaluated by the above-described methods. The results are shown in Table 1.

From the comparison between EXAMPLE 1 and COMPARATIVE EXAMPLE 1 both relating to the production of 1-butene polymers, it was confirmed that COMPARATIVE EXAMPLE 1 using methyl aluminoxane instead of the organoboron compound was deteriorated in catalytic activity. The same tendency was recognized in EXAMPLES 2 and 3 relating to the production of 1-butene copolymers and EXAMPLES 4 and 5 relating to the production of 1-butene polymers, namely COMPARATIVE EXAMPLE 1 was deteriorated in catalytic activity as compared to these EXAMPLES.

In addition, the polymers obtained in these EXAMPLES showed a lower weight-average molecular weight and a lower intrinsic viscosity [η] as compared to those of COMPARATIVE EXAMPLES.

That is, in the EXAMPLES of the present invention, high-fluidity 1-butene-based polymers were produced.

As recognized from EXAMPLES 4 and 5, since the catalysts used in these EXAMPLES had an excellent heat resistance, it was possible to raise the polymerization temperature while maintaining the high catalytic activity. Further, since the catalysts exhibited a high sensitivity to hydrogen, it was also possible to produce suitable 1-butene-based polymers having a high fluidity.

TABLE 1

|  | Examples | | | | | Com. Ex. |
|---|---|---|---|---|---|---|
|  | 1 | 2 | 3 | 4 | 5 | 1 |
| Mesopentad fraction (mmmm) (mol %) | 71.2 | — | — | 68.0 | 68.5 | 72 |
| Abnormal insertion content (1,4-insertion fraction) (mol %) | 0 | — | — | 0 | 0 | 0 |
| Kind of comonomer | — | * | ** | — | — | — |
| Comonomer content (mol %) | — | 27 | 3 | — | — | — |
| Stereoregularity index (mmmm/(mmrr + rmmr) | 8 | 9 | 9 | 7 | 7 | 8 |
| Intrinsic viscosity [η] (dL/g) | 0.4 | 0.4 | 0.4 | 0.22 | 0.27 | 1.0 |
| Weight-average molecular weight × $10^4$ (Mw) | 8 | 9 | 8 | 3.3 | 4.8 | 28 |
| Molecular weight distribution (Mw/Mn) | 2.0 | 2.0 | 2.0 | 1.9 | 2.7 | 2.0 |
| Melting point (Tm – D) (° C.) | 67 | 41 | 46 | 70.6 | 67 | 65 |
| Melting endotherm (ΔH) (J/g) | 38 | 14 | 29 | 37.8 | 24 | 40 |
| Tensile modulus (MPa) | 270 | 60 | 105 | 160 | 172 | 200 |
| Elongation at break (%) | 120 | 650 | 510 | 5.3 | 11 | 470 |

Note
*: propylene;
**: 1-octene

EXAMPLE 6

A 10 L autoclave previously heat-dried was charged with 4,000 mL of heptane, 4,000 mL of 1-butene, 4.0 mM of triisobutyl aluminum and 15 mM of methyl aluminoxane, and then hydrogen was introduced into the autoclave until reaching 0.4 MPa.

After heating the contents of the autoclave to 70° C. while stirring, , 15 μM of (1,2'-dimethylsilylene)(2,1'-dimethylsilylene)-bis(3-trimethylsilylmethylindenyl)zirconium dichloride was added to the autoclave, and the polymerization was conducted for 120 min.

After completion of the polymerization reaction, the resultant reaction product was dried under reduced pressure to obtain 1,530 g of a 1-butene polymer.

The resin properties and physical properties of the thus obtained 1-butene polymer were evaluated by the above-described methods. The results are shown in Table 2.

EXAMPLE 7

An one liter autoclave previously heat-dried was charged with 200 mL of heptane, 200 mL of 1-butene, 0.5 mM of triisobutyl aluminum and 0.4 mM of methyl aluminoxane, and then hydrogen was introduced into the autoclave until reaching 0.4 Pa.

After heating the contents of the autoclave to 60° C. while stirring, , 0.4 μM of (1,2'-dimethylsilylene)(2,1'-dimethylsilylene)-bis(3-trimethylsilylmethylindenyl)zirconium dichloride was added to the autoclave, and the polymerization was conducted for 60 min.

After completion of the polymerization reaction, the resultant reaction product was dried under reduced pressure to obtain 44 g of a 1-butene polymer.

The resin properties and physical properties of the thus obtained 1-butene polymer were evaluated by the above-described methods. The results are shown in Table 2.

COMPARATIVE EXAMPLE 2

A 10 L autoclave previously heat-dried was charged with 4,000 mL of heptane, 4,000 mL of 1-butene, 4.0 mM of triisobutyl aluminum and 20 μM of dimethyl anilinium borate, and then hydrogen was introduced into the autoclave until reaching 0.2 Pa.

After heating the contents of the autoclave to 60° C. while stirring, , 5 μM of (1,2'-dimethylsilylene)(2,1'-dimethylsilylene)-bis(3-trimethylsilylmethylindenyl)zirconium dichloride was added to the autoclave, and the polymerization was conducted for 60 min.

After completion of the polymerization reaction, the resultant reaction product was dried under reduced pressure to obtain 1,180 g of a 1-butene polymer.

The resin properties and physical properties of the thus obtained 1-butene polymer were evaluated by the above-described methods. The results are shown in Table 2.

COMPARATIVE EXAMPLE 3

The same procedure as in EXAMPLE 6 was repeated except for changing the polymerization temperature to 50° C. The polymerization reaction was conducted for 120 min, thereby obtaining 980 g of a 1-butene-based polymer.

The resin properties and physical properties of the thus obtained 1-butene polymer were evaluated by the above-described methods. The results are shown in Table 2.

COMPARATIVE EXAMPLE 4

A 10 L autoclave previously heat-dried was charged with 4,000 mL of heptane, 4,000 mL of 1-butene, 4.0 mM of triisobutyl aluminum and 5 µM of methyl aluminoxane, and then hydrogen was introduced into the autoclave until reaching 0.6 Pa.

The resin properties and physical properties of the thus obtained 1-butene polymer were evaluated by the above-described methods. The results are shown in Table 2.

The polymers obtained in the above EXAMPLES 1 to 7 and COMPARATIVE EXAMPLES 2, 4 and 5 exhibited a high fluidity and a high flexibility as compared to that obtained in COMPARATIVE EXAMPLE 1. In particular, the polymers obtained in EXAMPLES 1, 6 and 7 exhibited a high tenacity in addition to higher fluidity and high flexibility.

The polymer obtained in COMPARATIVE EXAMPLE 2 had a low tensile elongation at break owing to its low intrinsic viscosity [η]. On the other hand, the polymer having a too large intrinsic viscosity [η] as produced in COMPARATIVE EXAMPLE 3 exhibited a good tensile elongation at break, but was deteriorated in fluidity due to its large zero-shear viscosity.

The polymer obtained in COMPARATIVE EXAMPLE 4 had a too high stereoregularity, and the polymer obtained in COMPARATIVE EXAMPLE 5 had a too low stereoregularity. Therefore, both of the polymers were deteriorated in tensile elongation at break.

TABLE 2

|  | Examples | | Comparative Examples | | | |
| --- | --- | --- | --- | --- | --- | --- |
|  | 6 | 7 | 2 | 3 | 4 | 5 |
| [η] (dL/g) | 0.36 | 0.41 | 0.22 | 0.57 | 0.38 | 0.32 |
| Tm (° C.) | 71 | 82.4 | 70.6 | 81.7 | 73.9 | 70.3 |
| (mmmm) (%) | 70.3 | 72.4 | 68.5 | 73.1 | 75.2 | 67.5 |
| Mw | 65800 | 79000 | 37000 | 127000 | 69800 | 58100 |
| Mw/Mn | 1.78 | 1.78 | 1.9 | 1.81 | 1.74 | 2.35 |
| Tensile elongation at break (%) | 130 | 240 | 5.3 | 370 | 99 | 12 |
| Tensile modulus (MPa) | 233 | 245 | 160 | 221 | 255 | 236 |
| Zero-shear viscosity (Pa · s) | 47.9 | 194 | 10 | 479 | 91 | 41 |

After heating the contents of the autoclave to 50° C. while stirring, 5 µM of (1,2'-dimethylsilylene)(2,1'-dimethylsilylene)-bis(3-trimethylsilylmethylindenyl)zirconium dichloride was added to the autoclave, and the polymerization was conducted for 180 min.

After completion of the polymerization reaction, the resultant reaction product was dried under reduced pressure to obtain 450 g of a 1-butene polymer.

The resin properties and physical properties of the thus obtained 1-butene polymer were evaluated by the above-described methods. The results are shown in Table 2.

COMPARATIVE EXAMPLE 5

An one liter autoclave previously heat-dried was charged with 200 mL of heptane, 200 mL of 1-butene, 0.5 mM of triisobutyl aluminum and 0.8 µM of dimethyl anilinium borate, and then hydrogen was introduced into the autoclave until reaching 0.03 Pa.

After heating the contents of the autoclave to 80° C. while stirring, 0.2 µM of (1,2'-dimethylsilylene)(2,1'-dimethylsilylene)-bis(3-trimethylsilylmethylindenyl)zirconium dichloride was added to the autoclave, and the polymerization was conducted for 30 min.

After completion of the polymerization reaction, the resultant reaction product was dried under reduced pressure to obtain 25 g of a 1-butene polymer.

INDUSTRIAL APPLICABILITY

According to the present invention, it is possible to produce a 1-butene-based polymer having a uniform composition, a well-controlled stereoregularity, a high fluidity and a high flexibility.

In addition, the 1-butene-based resin modifier of the present invention can provide a molded article exhibiting a good softness, a less stickiness and an excellent compatibility with polyolefin resins.

Further, the hot-melt adhesive of the present invention is excellent in thermal stability and fluidity under high temperature conditions, adhesion to low-polar substances and heat resistance at a bonded surface.

What is claimed is:

1. A process for producing a high-fluidity 1-butene-based polymer, comprising:
homopolymerizing 1-butene, or copolymerizing 1-butene with ethylene and/or a $C_3$ to $C_{20}$ α-olefin except for 1-butene, in the presence of a polymerization catalyst comprising:
(A) a transition metal compound having as a ligand, a double crosslinking type biscyclopentadienyl derivative represented by the following general formula (II):

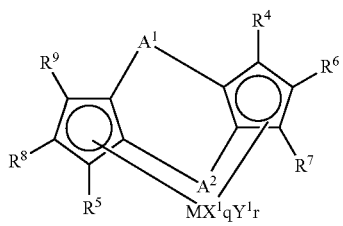

(II)

wherein M is a metal element belonging to Groups 3 to 10 or lanthanoid of the Period Table;

$X^1$ is a ligand that forms a σ-bond with the proviso that when a plurality of $X^1$ groups are present, these $X^1$ groups may be the same or different from each other, and may be cross-linked with the other $X^1$ group or $Y^1$;

$Y^1$ is a Lewis base with the proviso that when a plurality of $Y^1$ groups are present, these $Y^1$ groups may be the same or different from each other, and may be cross-linked with the other $Y^1$ group or $X^1$;

$R^4$ and $R^5$ are independently a hydrogen atom, a halogen atom, a $C_1$ to $C_{20}$ hydrocarbon group, a $C_1$ to $C_{20}$ halogen-containing hydrocarbon group, a silicon-containing group or a hetero atom-containing group, and $R^6$ and $R^7$ as well as $R^8$ and $R^9$ are bonded to each other to form a ring;

$A^1$ and $A^2$ are divalent cross-linking groups which may be the same or different from each other, and are independently a $C_1$ to $C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein $R^1$ is a hydrogen atom, a halogen atom, or a $C_1$ to $C_{20}$ halogen-containing hydrocarbon group;

q is an integer of 1 to 5 given by the formula:

[(valence of M)–2];

and r is an integer of 0 to 3, and (B) at least one component selected from the group consisting of (B-1) a compound capable of forming an ionic complex by reacting with said transition metal compound (A), and (B-2) aluminoxane.

2. The process according to claim 1, wherein 1-butene is homopolymerized in the presence of the polymerization catalyst containing an organoboron compound as the component (B).

3. The process according to claim 1, wherein 1-butene is copolymerized with ethylene and/or a $C_3$ to $C_{20}$ α-olefin except for 1-butene in the presence of the polymerization catalyst containing an organoboron compound as the component (B).

4. The process according to claim 1, wherein the component (B) is an organoboron compound.

5. A process for producing a high-fluidity 1-butene-based polymer satisfying the following requirements (1), (2), and (3):

(1) has an intrinsic viscosity [η] of 0.01 to 0.5 dL/g as measured in a tetralin solvent at 135° C.;

(2) is a crystalline resin having a melting point (Tm-D) of 0 to 100° C., the melting point being defined as a top of a peak observed on a highest-temperature side in a melting endothermic curve obtained by a differential scanning calorimeter (DSC) when a sample is held in a nitrogen atmosphere at −10° C. for 5 mm. and then heated at a temperature rise rate of 10° C./min.; and (3) has a stereoregularity index {(mmmm)/(mmrr+rmmr)} of 30 or lower, comprising:

homopolymerizing 1-butene, or copolymerizing 1-butene with ethylene and/or a $C_3$ to C20 α-olefin except for 1-butene, in the presence of a polymerization catalyst comprising:

(A) a transition metal compound having as a ligand, a double crosslinking type biscyclopentadienyl derivative represented by the following general formula (II):

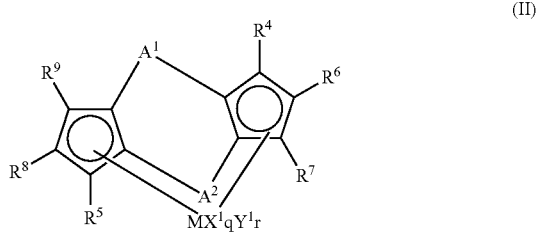

(II)

wherein M is a metal element belonging to Groups 3 to 10 or lanthanoid of the Periodic Table;

$X^1$ is a ligand that forms a σ-bond with the proviso that when a plurality of $X^1$ groups are present, these $X^1$ groups may be the same or different from each other and may be cross-linked with the other $X^1$ or $Y^1$;

$Y^1$ is a Lewis base with the proviso that when a plurality of $Y^1$ groups are present, these $Y^1$ groups may be the same or different and may be cross-linked with the other $Y^1$ group or $X^1$;

$R^4$ and $R^5$ are independently a hydrogen atom, a halogen atom, a $C_1$ to $C_{20}$ hydrocarbon group, a $C_1$ to $C_{20}$ halogen-containing hydrocarbon group, a silicon-containing group or a hetero atom-containing group, and $R^6$ and $R^7$ as well as $R^8$ and $R^9$ are bonded to each other to form a ring;

$A^1$ and $A^2$ are divalent cross-linking groups which may be the same or different from each other, and are independently a $C_1$ to $C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein $R^1$ is a hydrogen atom, a halogen atom, or a $C_1$ to $C_{20}$ halogen-containing hydrocarbon group;

q is an integer of 1 to 5 given by the formula:

[(valence of M)–2];

and r is an integer of 0 to 3; and (B) at least one component selected from the group consisting of (B-1) a compound capable of forming an ionic complex by reacting with said transition metal compound (A), and (B-2) aluminoxane.

6. The process according to claim 5, wherein said polymer further satisfies the following requirements (4) and (5):

(4) a molecular weight distribution (Mw/Mn) of 4 or lower as measured by gel permeation chromatography (GPC); and (5) a weight-average molecular weight (Mw) of 10,000 to 100,000 as measured by GPC.

7. A process for producing a high-fluidity 1-butene-based polymer satisfying the following requirements (1), (2), and (3'):
  (1) has an intrinsic viscosity [η] of 0.25 to 0.5 dL/g as measured in a tetralin solvent at 135° C.;
  (2) is a crystalline resin having a melting point (Tm-D) of 0 to 100° C., the melting point being defined as a top of a peak observed on a highest-temperature side in a melting endothermic curve obtained by a differential scanning calorimeter (DSC) when a sample is held in a nitrogen atmosphere at −10° C. for 5 min. and then heated at a temperature rise rate of 10° C./min.; and
  (3') has a mesopentad fraction (mmmm) of 68 to 73% as determined from a nuclear magnetic resonance (NMR) spectrum, comprising:

homopolymerizing 1-butene, or copolymerizing 1-butene with ethylene and/or a $C_3$ to $C_{20}$ α-olefin except for 1-butene, in the presence of a polymerization catalyst comprising:

(A) a transition metal compound having as a ligand, a double crosslinking type biscyclopentadienyl derivative represented by the following general formula (II):

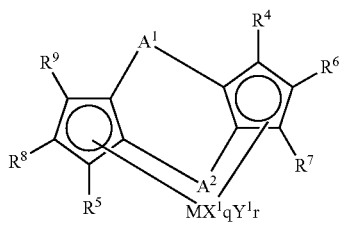

(II)

wherein M is a metal element belonging to Groups 3 to 10 or lanthanoid of the Periodic Table;

$X^1$ is a ligand that forms a σ-bond with the proviso that when a plurality of $X^1$ groups are present, these $X^1$ groups may be the same or different from each other and may be cross-linked with the other $X^1$ or $Y^1$;

$Y^1$ is a Lewis base with the proviso that when a plurality of $Y^1$ groups are present, these $Y^1$ groups may be the same or different and may be cross-linked with the other $Y^1$ group or $X^1$;

$R^4$ and $R^5$ are independently a hydrogen atom, a halogen atom, a $C_1$ to $C_{20}$ hydrocarbon group, a $C_1$ to $C_{20}$ halogen-containing hydrocarbon group, a silicon-containing group or a hetero atom-containing group, and $R^6$ and $R^7$ as well as $R^8$ and $R^9$ are bonded to each other to form a ring;

$A^1$ and $A^2$ are divalent cross-linking groups which may be the same or different from each other, and are independently a $C_1$ to $C_{20}$ halogen-containing hydrocarbon group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$— wherein $R^1$ is a hydrogen atom, a halogen atom, or a $C_1$ to $C_{20}$ halogen-containing hydrocarbon group;

q is an integer of 1 to 5 given by the formula:

[(valence of M)−2];

and r is an integer of 0 to 3; and (B) at least one component selected from the group consisting of (B-1) a compound capable of forming an ionic complex by reacting with said transition metal compound (A), and (B-2) aluminoxane.

8. The process according to claim 7, wherein said polymer has a zero-shear viscosity $η^0$ of 300 Pa·s or lower and a tensile elongation at break of 100% or more.

9. The process according to claim 7, wherein said polymer further satisfies the following requirements (4) and (5):
  (4) a molecular weight distribution (Mw/Mn) of 4 or lower as measured by gel permeation chromatography (GPC); and
  (5) a weight-average molecular weight (Mw) of 10,000 to 100,000 as measured by GPC.

* * * * *